United States Patent
Bohn et al.

(10) Patent No.: US 11,095,164 B2
(45) Date of Patent: Aug. 17, 2021

(54) WIRELESS POWER TRANSFER

(71) Applicant: California Institute of Technology, Pasadena, CA (US)

(72) Inventors: Florian Bohn, Pasadena, CA (US); Behrooz Abiri, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/109,591

(22) Filed: Aug. 22, 2018

(65) Prior Publication Data
US 2019/0260237 A1    Aug. 22, 2019

Related U.S. Application Data

(63) Continuation of application No. 14/830,692, filed on Aug. 19, 2015, now Pat. No. 10,090,714.
(Continued)

(51) Int. Cl.
*H02J 50/20*    (2016.01)
*H02J 50/40*    (2016.01)
(Continued)

(52) U.S. Cl.
CPC .............. *H02J 50/20* (2016.02); *H02J 7/025* (2013.01); *H02J 50/40* (2016.02); *H04B 5/0037* (2013.01); *H04B 5/0075* (2013.01)

(58) Field of Classification Search
CPC ............ H02J 7/025; H02J 50/20; H02J 50/40; H04B 5/0037; H04B 5/0075
(Continued)

(56) References Cited

U.S. PATENT DOCUMENTS

| | | | |
|---|---|---|---|
| 1,119,732 A | 5/1907 | Tesla | |
| 5,400,037 A | 3/1995 | East | |

(Continued)

FOREIGN PATENT DOCUMENTS

| CN | 101162267 A | 4/2008 |
|---|---|---|
| CN | 101309639 A | 11/2008 |
| CN | 1020899592 A | 6/2011 |
| CN | 102640394 A | 8/2012 |

(Continued)

OTHER PUBLICATIONS

Baarman, "Making Wireless Truly Wireless: The need for a universal Wireless Power Solution," Wireless Power Consortium, (Sep. 2009). [Retrieved from the Internet Jan. 9, 2017: <https://www.wirelesspowerconsortium.com/technology/making-wireless-truly-wireless.html>].

(Continued)

*Primary Examiner* — William Hernandez
(74) *Attorney, Agent, or Firm* — Alston & Bird LLP

(57) ABSTRACT

A method of generating a DC power from incident RF waves, includes, in part, measuring the amount of power being received by a device generating the DC power, and controlling the phases of the RF waves being transmitted by a multitude of RF transmitters in accordance with the measured power. A programmable test load is optionally used at the device to measure the received power. The device optionally includes, an antenna, an RF-to-DC converter to generate the DC power, an impedance matching/transformation circuit, and an RF load/matching circuit.

10 Claims, 15 Drawing Sheets

Related U.S. Application Data

(60) Provisional application No. 62/039,321, filed on Aug. 19, 2014.

(51) Int. Cl.
*H02J 7/02* (2016.01)
*H04B 5/00* (2006.01)

(58) Field of Classification Search
USPC .......................................................... 307/104
See application file for complete search history.

(56) References Cited

U.S. PATENT DOCUMENTS

| | | | |
|---|---|---|---|
| 6,127,799 A | 10/2000 | Krishnan | |
| 6,184,651 B1 | 2/2001 | Fernandez et al. | |
| 6,208,287 B1 | 3/2001 | Sikina et al. | |
| 6,404,268 B1 | 6/2002 | Hung et al. | |
| 6,664,770 B1 | 12/2003 | Bartels | |
| 6,946,950 B1 | 9/2005 | Ueno et al. | |
| 6,967,462 B1 | 11/2005 | Landis | |
| 7,027,311 B2 | 4/2006 | Vanderelli et al. | |
| 7,212,414 B2 | 5/2007 | Baarman | |
| 7,356,952 B2 | 4/2008 | Sweeney et al. | |
| 7,522,878 B2 | 4/2009 | Baarman | |
| 7,554,316 B2 | 6/2009 | Stevens et al. | |
| 7,868,482 B2 | 1/2011 | Greene et al. | |
| 8,004,235 B2 | 8/2011 | Baarman et al. | |
| 8,284,055 B2 | 10/2012 | Butler et al. | |
| 8,396,173 B2 | 3/2013 | Ling et al. | |
| 8,829,972 B2 | 9/2014 | Nakaie et al. | |
| 9,030,161 B2 | 5/2015 | Lu et al. | |
| 9,124,125 B2 | 9/2015 | Leabman et al. | |
| 9,130,397 B2 | 9/2015 | Leabman et al. | |
| 9,130,602 B2 | 9/2015 | Cook et al. | |
| 9,154,002 B2 | 10/2015 | Norconk et al. | |
| 9,173,178 B2 | 10/2015 | Chakraborty et al. | |
| 9,252,846 B2 | 2/2016 | Lee et al. | |
| 9,601,267 B2 | 3/2017 | Widmer et al. | |
| 9,735,605 B2 * | 8/2017 | Garcia Briz | H02J 7/04 |
| 9,772,401 B2 * | 9/2017 | Widmer | H02J 50/80 |
| 9,983,243 B2 * | 5/2018 | Lafontaine | H02J 50/12 |
| 10,003,278 B2 | 6/2018 | Hajimiri et al. | |
| 10,033,230 B2 * | 7/2018 | Sindia | H02J 7/025 |
| 10,090,714 B2 | 10/2018 | Bohn et al. | |
| 10,320,242 B2 | 6/2019 | Hajimiri et al. | |
| 10,720,797 B2 | 7/2020 | Hajimiri et al. | |
| 2002/0030527 A1 | 3/2002 | Hung et al. | |
| 2002/0090966 A1 | 7/2002 | Hansen et al. | |
| 2004/0005863 A1 | 1/2004 | Carrender | |
| 2004/0266338 A1 | 12/2004 | Rowitch | |
| 2006/0121869 A1 | 6/2006 | Natarajan et al. | |
| 2006/0205381 A1 | 9/2006 | Beart et al. | |
| 2006/0287596 A1 | 12/2006 | Johnson et al. | |
| 2007/0178945 A1 | 8/2007 | Cook et al. | |
| 2007/0182367 A1 | 8/2007 | Partovi et al. | |
| 2008/0014897 A1 | 1/2008 | Cook et al. | |
| 2008/0116847 A1 | 5/2008 | Loke et al. | |
| 2008/0309452 A1 | 12/2008 | Zeine | |
| 2009/0011734 A1 | 1/2009 | Mertens et al. | |
| 2009/0261779 A1 | 10/2009 | Zyren | |
| 2010/0033021 A1 | 2/2010 | Bennett | |
| 2010/0034238 A1 | 2/2010 | Bennett | |
| 2010/0048255 A1 | 2/2010 | Jojivet et al. | |
| 2010/0142509 A1 | 6/2010 | Zhu et al. | |
| 2010/0181961 A1 | 7/2010 | Novak et al. | |
| 2010/0208848 A1 | 8/2010 | Zhu et al. | |
| 2010/0214159 A1 | 8/2010 | Ookawa et al. | |
| 2010/0231382 A1 | 9/2010 | Tayrarni et al. | |
| 2010/0259447 A1 | 10/2010 | Crouch | |
| 2010/0277003 A1 | 11/2010 | Von Novak et al. | |
| 2010/0309078 A1 | 12/2010 | Rofougaran et al. | |
| 2010/0315045 A1 | 12/2010 | Zeine | |
| 2010/0323616 A1 | 12/2010 | Von Novak et al. | |
| 2011/0025133 A1 | 2/2011 | Sauerlaender et al. | |
| 2011/0050166 A1 | 3/2011 | Cook et al. | |
| 2011/0053500 A1 | 3/2011 | Menegoli et al. | |
| 2011/0124310 A1 | 5/2011 | Theilmann et al. | |
| 2011/0127848 A1 | 6/2011 | Ryu et al. | |
| 2011/0151789 A1 | 6/2011 | Viglione et al. | |
| 2011/0156640 A1 | 6/2011 | Moshfeghi | |
| 2011/0167291 A1 | 7/2011 | Liu et al. | |
| 2011/0181237 A1 | 7/2011 | Hamedi-Hagh et al. | |
| 2012/0091799 A1 | 4/2012 | Rofougaran et al. | |
| 2012/0126636 A1 | 5/2012 | Atsumi | |
| 2012/0217111 A1 | 8/2012 | Boys et al. | |
| 2012/0294054 A1 | 11/2012 | Kim et al. | |
| 2012/0306284 A1 | 12/2012 | Lee et al. | |
| 2012/0326660 A1 | 12/2012 | Lu et al. | |
| 2013/0062959 A1 * | 3/2013 | Lee | H02J 5/005 307/104 |
| 2013/0082651 A1 | 4/2013 | Park et al. | |
| 2013/0099584 A1 | 4/2013 | Von Novak, III | |
| 2013/0137455 A1 | 5/2013 | Xia et al. | |
| 2013/0169348 A1 | 7/2013 | Ping | |
| 2013/0201003 A1 | 8/2013 | Sabesan et al. | |
| 2013/0210477 A1 | 8/2013 | Peter | |
| 2013/0249682 A1 * | 9/2013 | Van Wiemeersch | B60L 50/16 340/426.24 |
| 2013/0343106 A1 | 12/2013 | Perreault et al. | |
| 2014/0008993 A1 | 1/2014 | Leabman | |
| 2014/0015344 A1 | 1/2014 | Mohamadi | |
| 2014/0112409 A1 | 4/2014 | Takei | |
| 2014/0175893 A1 | 6/2014 | Sengupta et al. | |
| 2014/0203768 A1 | 7/2014 | Andic et al. | |
| 2014/0333256 A1 | 11/2014 | Widmer et al. | |
| 2015/0015194 A1 | 1/2015 | Leabman et al. | |
| 2015/0022147 A1 | 1/2015 | Jung | |
| 2015/0130293 A1 | 5/2015 | Hajimiri et al. | |
| 2015/0144701 A1 | 5/2015 | Xian et al. | |
| 2015/0155739 A1 | 6/2015 | Walley et al. | |
| 2015/0372541 A1 | 12/2015 | Guo et al. | |
| 2016/0094091 A1 | 3/2016 | Shin et al. | |
| 2016/0134150 A1 | 5/2016 | Chen et al. | |
| 2016/0181873 A1 | 6/2016 | Mitcheson et al. | |
| 2016/0285481 A1 | 9/2016 | Cohen | |
| 2016/0380439 A1 * | 12/2016 | Shao | H02J 50/80 307/104 |
| 2017/0111073 A1 | 4/2017 | Hajimiri et al. | |
| 2017/0237469 A1 | 8/2017 | Taghivand | |
| 2018/0226841 A1 | 8/2018 | Sengupta et al. | |
| 2018/0233963 A1 | 8/2018 | Sengupta et al. | |
| 2018/0233964 A1 | 8/2018 | Sengupta et al. | |
| 2019/0006888 A1 | 1/2019 | Hajimiri et al. | |
| 2019/0044390 A1 | 2/2019 | Hajimiri et al. | |
| 2019/0245389 A1 * | 8/2019 | Johnston | H02J 50/05 |
| 2020/0083752 A1 * | 3/2020 | Bohn | H02J 50/60 |

FOREIGN PATENT DOCUMENTS

| | | |
|---|---|---|
| CN | 103748767 A | 4/2014 |
| CN | 103782521 A | 5/2014 |
| CN | 104885333 A | 9/2015 |
| EP | 2858209 A1 | 4/2015 |
| JP | 2008-245404 A | 10/2008 |
| JP | 2013-005529 A | 1/2013 |
| KR | 10-2011-0133242 A | 12/2011 |
| KR | 10-2011-0135507 A | 12/2011 |
| KR | 10-2012-0069496 A | 6/2012 |
| WO | WO 2007/084716 A2 | 7/2007 |
| WO | WO 2010/006078 A1 | 1/2010 |
| WO | 20120401 A1 | 10/2012 |
| WO | WO 2013/151259 A1 | 10/2013 |
| WO | WO 2014/075109 A1 | 5/2014 |
| WO | WO 2015/077726 A | 5/2015 |
| WO | WO 2015/077730 A1 | 5/2015 |
| WO | WO 2016/028939 A1 | 2/2016 |
| WO | WO 2017/053631 A1 | 3/2017 |

OTHER PUBLICATIONS

Dickinson, "Evaluation of a Microwave High Power Reception Conversion Array for Wireless Power Transmission," Tech. Memo.

(56) References Cited

OTHER PUBLICATIONS 33-41, Jet Propulsion Laboratory, California Institute of Technology, (Sep. 1, 1975). [Retrieved from the Internet Jan. 9, 2017: <https://ntrs.nasa.gov/archive/nasa/casi.ntrs.nasa.gov/19760004119.pdf>].
Dickinson, "Performance of a High-Power, 2.388-GHz Receiving Array in Wireless Power Transmission Over 1.54 km," Microwave Symposium, 1976, IEEE-MTT-S International, pp. 139-141, IEEE, (1976).
Hirai, et al., "Practical Study on Wireless Transmission of Power and Information for Autonomous Decentralized Manufacturing System," IEEE Transactions on Industrial Electronics, 46(2):349-359, (1999).
Karalis, et al., "Efficient wireless non-radiative mid-range energy transfer," Annals of Physics, 323(2008):34-38, (2008).
Kotani et al., "High-Efficiency Differential-Drive CMOS Rectifier for UHF RFIDs," IEEE Journal of Solid-State Circuits, 44(11):3011-3018, (2009).
Kurs, et al., "Wireless Power Transfer via Strongly Coupled Magnetic Resonances," Science, 371(83):83-86, (2007).
Moon et al., "A 3.0-W Wireless Power Receiver Circuit with 75-% Overall Efficiency," IEEE Asian Solid State Circuits Conference (A-SSCC), pp. 97-100, Nov. 12, 2012.
Tong, "A Novel Differential Microstrip Patch Antenna and Array at 79 GHz,", Proc. Int. Antennas Propag. Symp., pp. 279-280, (2008). [Retrieved from the Internet Jan. 9, 2017: <https://www.researchgate.net/profile/Christoph_Wagner4/publication/228992601_A_novel_differential_microstrip_patch_antenna_and_array_at_79_GHz/links/00b4952930cb62e535000000.pdb>].
Whitesides, "Researchers Beam 'Space' Solar Power in Hawaii," Wired Magazine, (Sep. 12, 2008). [Retrieved from the Internet Jan. 10, 2017: <https://www.wired.com/2008/09/visionary-beams/>].
Zheng, "Introduction to Air-to-air missiles system," Weapon Industry Press, Beijing, pp. 94-95, Dec. 31, 1997.
EP Supplementary European Search Report for application 13854148 dated Jun. 20, 2016.
EPO Application No. 15833852.5, Supplementary European Search Report and European Search Opinion dated May 18, 2018.
EPO Application No. EP14863147, Supplementary European Search Report completed Jun. 30, 2017.
EPO Application No. EP14863210, Supplementary European Search Report dated May 16, 2017.
PCT International Preliminary Report on Patentability for application PCT/US2013/069757 dated May 12, 2015.
PCT International Preliminary Report on Patentability for application PCT/US2014/067175 dated May 24, 2016.
PCT International Preliminary Report on Patentability for application PCT/US2014/067187 dated May 24, 2016.
PCT International Preliminary Report on Patentability for application PCT/US2015/045969 dated Feb. 21, 2017.
PCT International Search Report and Written Opinion of the International Searching Authority for application PCT/US2013/069757 dated Feb. 25, 2014.
PCT International Search Report and Written Opinion of the International Searching Authority for application PCT/US2014/067175 dated Mar. 16, 2015.
PCT International Search Report and Written Opinion of the International Searching Authority for application PCT/US2014/067187 dated Mar. 16, 2015.
PCT International Search Report and Written Opinion of the International Searching Authority for application PCT/US2015/045969 dated Oct. 23, 2015.
PCT International Search Report and Written Opinion of the International Searching Authority for application PCT/US2016/053202 dated Dec. 9, 2016.
U.S. Appl. No. 14/078,489, Final Office Action dated Feb. 24, 2017.
U.S. Appl. No. 14/078,489, Non-Final Office Action dated May 12, 2016.
U.S. Appl. No. 14/078,489, Non-Final Office Action dated Jun. 1, 2018.
U.S. Appl. No. 14/078,489, Non-Final Office Action dated Sep. 22, 2017.
U.S. Appl. No. 14/078,489, Response to Non-Final Office Action filed Mar. 20, 2018.
U.S. Appl. No. 14/078,489, Response to Non-Final Office Action filed Nov. 8, 2016.
U.S. Appl. No. 14/078,489, Supplemental Amendment filed Mar. 27, 2018.
U.S. Appl. No. 14/552,249, Non-Final Office Action dated Aug. 2, 2017.
U.S. Appl. No. 14/552,249, Notice of Allowance dated Feb. 22, 2018.
U.S. Appl. No. 14/552,249, Response to Non-Final Office Action filed Jan. 19, 2018.
U.S. Appl. No. 14/552,414, Final Office Action dated Oct. 26, 2017.
U.S. Appl. No. 14/552,414, Non-Final Office Action dated Mar. 24, 2017.
U.S. Appl. No. 14/552,414, Non-Final Office Action dated Mar. 26, 2018.
U.S. Appl. No. 14/552,414, Notice of Allowance dated Oct. 9, 2018.
U.S. Appl. No. 14/552,414, Response to Final Office Action filed Jan. 25, 2018.
U.S. Appl. No. 14/552,414, Response to Non-Final Office Action filed Sep. 25, 2017.
U.S. Appl. No. 14/552,414, Response to Non-Final Office Action filed Sep. 26, 2018.
U.S. Appl. No. 14/830,692, Non-Final Office Action dated Oct. 16, 2017.
U.S. Appl. No. 14/830,692, Notice of Allowance dated May 18, 2018.
U.S. Appl. No. 14/830,692, Notice of Allowance dated Jun. 14, 2018.
U.S. Appl. No. 14/830,692, Requirement for Restriction/Election dated Jul. 6, 2017.
U.S. Appl. No. 14/830,692, Response to Non-Final Office Action filed Apr. 16, 2018.
U.S. Appl. No. 14/830,692, Response to Requirement for Restriction/Election filed Aug. 15, 2017.
U.S. Appl. No. 15/273,633, Non-Final Office Action dated Sep. 20, 2018.
U.S. Appl. No. 15/273,633, Requirement for Restriction/Election dated Mar. 28, 2018.
WIPO Application No. PCT/US2016/053202, PCT International Preliminary Report on Patentability dated Mar. 27, 2018.
WIPO Application No. PCT/US2018/034947, PCT International Search Report and Written Opinion of the International Searching Authority dated Aug. 3, 2018.
U.S. Appl. No. 14/078,489, Non-Final Office Action dated Jan. 28, 2019.
U.S. Appl. No. 14/552,414, Notice of Allowance dated Feb. 12, 2019.
U.S. Appl. No. 15/273,633, Response to Non-Final Office Action filed Feb. 22, 2019.
U.S. Appl. No. 15/273,633, Non-Final Office Action dated May 28, 2020.
U.S. Appl. No. 16/143,332, Non-Final Office Action dated Jul. 26, 2019.
WIPO Application No. PCT/US2018/034947, PCT International Preliminary Report on Patentability dated Nov. 26, 2019.
EPO Application No. EP16849637.0, Supplementary European Search Report completed Apr. 9, 2019.
U.S. Appl. No. 14/078,489, Notice of Allowance dated Jun. 3, 2019.
U.S. Appl. No. 14/552,414, Notice of Allowance dated Apr. 30, 2019.
U.S. Appl. No. 15/273,633, Final Office Action dated Jun. 13, 2019.
U.S. Appl. No. 15/942,211, Non-Final Office Action dated Jul. 29, 2019.
U.S. Appl. No. 15/952,124, Non-Final Office Action dated Jul. 29, 2019.
U.S. Appl. No. 15/952,128, Non-Final Office Action dated Jul. 29, 2019.

(56) References Cited

OTHER PUBLICATIONS

U.S. Appl. No. 15/992,089, Non-Final Office Action dated Jun. 7, 2019.
U.S. Appl. No. 15/942,211, Final Office Action dated May 13, 2020.
U.S. Appl. No. 15/952,124, Final Office Action dated May 13, 2020.
U.S. Appl. No. 15/952,128, Final Office Action dated May 13, 2020.
U.S. Appl. No. 14/078,489, Final Office Action dated Jun. 1, 2018.
U.S. Appl. No. 14/078,489, Response to Final Office Action filed Dec. 3, 2018.
U.S. Appl. No. 15/992,089, Notice of Allowance dated Mar. 23, 2020.
U.S. Appl. No. 16/143,332, Final Office Action dated Dec. 26, 2019.
U.S. Appl. No. 15/273,633, Final Office Action dated Mar. 4, 2021.
U.S. Appl. No. 15/952,124, Non-Final Office Action dated Feb. 24, 2021.
EPO Application No. EP20199533, Extended European Search Report dated Dec. 21, 2020.

* cited by examiner

WIRELESS POWER TRANSFER

CROSS REFERENCE TO RELATED APPLICATIONS

This application is a Continuation of Ser. No. 14/830,692, filed on Aug. 19, 2015, entitled "Wireless Power Transfer", which claims the benefit under 35 § U.S.C 119(e) of U.S. Provisional Patent Application 62/039,321, filed Aug. 19, 2014, entitled "Method for Wireless Power Transfer", the contents of which are incorporated herein by reference in their entirety.

The present application is related to the following US Applications:

application Ser. No. 14/078,489, filed Nov. 12, 2013, entitled "Smart RF Lensing: Efficient, Dynamic And Mobile Wireless Power Transfer", application Ser. No. 14/552,249, filed Nov. 24, 2014, entitled "Active CMOS Recovery Units For Wireless Power Transmission", and application Ser. No. 14/552,414, filed Nov. 24, 2014, entitled "Generator Unit For Wireless Power Transfer", the contents of all of which applications are incorporated herein by reference in their entirety.

FIELD OF THE INVENTION

The present invention relates to wireless communication, and more particularly to wireless power transfer.

BACKGROUND OF THE INVENTION

Electrical energy used in powering electronic devices comes predominantly from wired sources. Conventional wireless power transfer relies on magnetic inductive effect between two coils placed in close proximity of one another. To increase its efficiency, the coil size is selected to be less than the wavelength of the radiated electromagnetic wave. The transferred power diminishes strongly as the distance between the source and the charging device is increased.

BRIEF SUMMARY OF THE INVENTION

A recovery unit adapted to receive a radio frequency (RF) power and generate a DC power in response, in accordance with one embodiment of the present invention, includes, in part, at least one antenna for receiving the RF power, an RF-to-DC converter adapted to generate the DC power, an impedance matching/transformation circuit disposed between the antenna and the RF-to-DC converter and adapted to provide impedance matching between the antenna and the RF-to-DC converter, and an RF load/matching circuit coupled to the RF-to-DC converter and adapted to block the RF power from reaching an output terminal of the RF-to-DC converter.

In one embodiment, the recovery unit further includes, in part, a DC-to-DC converter coupled to the output terminal of the RF-to-DC converter. In one embodiment, the recovery unit further includes, in part, an amplitude/power detector. In one embodiment, the amplitude/power detector is coupled to an output terminal of the at least one antenna. In one embodiment, the amplitude/power detector is coupled to an input terminal of the RF-to-DC converter. In one embodiment, the amplitude/power detector is coupled to the output terminal of the RF-to-DC converter.

In one embodiment, the recovery unit further includes, in part, a programmable load coupled to an input terminal of the DC-to-DC converter. In one embodiment, the recovery unit further includes, in part, a programmable load coupled to an output terminal of the DC-to-DC converter. In one embodiment, the recovery unit further includes, in part, a digital control block adapted to generate control signals for the recovery unit and to provide communication/control signals to a device receiving the DC power, and an analog-to-digital converter adapted to convert an output of the amplitude/power detector to a digital signal. In one embodiment, the recovery unit further includes, in part, a digital control block adapted to generate control signals for the recovery unit, and a transceiver adapted to communicate with a device receiving the DC power.

A recovery unit adapted to receive a radio frequency (RF) power and generate a DC power in response, in accordance with one embodiment of the present invention, includes, in part, a multitude of recovery elements coupled to one another in parallel, a DC-to-DC converter coupled to an output terminal of each of the multitude of recovery elements, an amplitude/power detector coupled to an output of the DC-to-DC converter, and a programmable load coupled to the output of the DC-to-DC converter. Each recovery element includes, in part, at least one antenna for receiving the RF power, an RF-to-DC converter, an impedance matching/transformation circuit disposed between the at least one antenna and the RF-to-DC converter and adapted to provide impedance matching between the antenna and the RF-to-DC converter, and an RF load/matching circuit coupled to the RF-to-DC converter and adapted to block the RF power from reaching an output terminal of the RF-to-DC converter.

In some embodiments, the recovery unit further includes, in part, a digital control block adapted to generate control signals for the recovery unit and provide communication/control signals to a device receiving the DC power, and an analog-to-digital converter adapted to convert an output of the amplitude/power detector to a digital signal. In some embodiments, the recovery unit further includes, in part, a digital control block adapted to generate control signals for the recovery unit, and a transceiver adapted to communicate with a device receiving the DC power.

A recovery unit adapted to receive a radio frequency (RF) power and generate a DC power in response, in accordance with one embodiment of the present invention, includes, in part, a multitude of recovery elements, and a multitude of DC-to-DC converters each associated with and coupled to an output of a different one of the multitude of recovery elements. The output terminals of the DC-to-DC converters are coupled to a common node. The recovery unit further includes, in part, an amplitude/power detector coupled to the common node, and a programmable test load coupled to the common node.

Each recovery element includes, in part, at least one antenna for receiving the RF power, an RF-to-DC converter, an impedance matching/transformation circuit disposed between the antenna and the RF-to-DC converter and adapted to provide impedance matching between the antenna and the RF-to-DC converter, and an RF load/matching circuit coupled to the RF-to-DC converter and adapted to block the RF power from reaching an output terminal of the RF-to-DC converter.

In some embodiments, the recovery unit further includes, in part, a digital control block adapted to generate control signals for the recovery unit and to provide communication/control signals to a device receiving the DC power, and an analog-to-digital converter adapted to convert an output of the amplitude/power detector to a digital signal.

In some embodiments, the recovery unit further includes, in part, a digital control block adapted to generate control signals for the recovery unit, and a transceiver adapted to communicate with a device receiving the DC power.

A recovery unit adapted to receive a radio frequency (RF) power and generate a DC power in response, in accordance with one embodiment of the present invention, includes, in part, a multitude of recovery elements, a multitude of DC-to-DC converters each associated with and coupled to an output of a different one of the multitude of recovery elements, a multitude of amplitude/power detectors each associated with and coupled to an output of a different one of the multitude of recovery elements, and a programmable test load coupled to a common node connecting the output terminals of the multitude of DC-to-DC converters to one another. Each recovery elements further includes, in part, at least one antenna for receiving the RF power, an RF-to-DC converter, an impedance matching/transformation circuit disposed between the antenna and the RF-to-DC converter and adapted to provide impedance matching between the antenna and the RF-to-DC converter, and an RF load/matching circuit coupled to the RF-to-DC converter and adapted to block the RF power from reaching an output terminal of the RF-to-DC converter.

The recovery unit, in accordance with one embodiment, further includes, in part, a digital control block adapted to generate control signals for the recovery unit and to provide communication/control signals to a device receiving the DC power, and an analog-to-digital converter adapted to convert an output of the amplitude/power detector to a digital signal. The recovery unit, in accordance with one embodiment, further includes, in part, a digital control block adapted to generate control signals for the recovery unit, and a transceiver adapted to communicate with a device receiving the DC power.

A recovery unit adapted to receive a radio frequency (RF) power and generate a DC power in response, in accordance with one embodiment of the present invention, includes, in part, a multitude of recovery elements coupled to one another in series, a DC-to-DC converter coupled to an output terminal of the last one of the series connected recovery elements, an amplitude/power detector coupled to an output of the DC-to-DC converter, and a programmable test load coupled to the output of the DC-to-DC converter. Each recovery elements further includes, in part, at least one antenna for receiving the RF power, an RF-to-DC converter, an impedance matching/transformation circuit disposed between the antenna and the RF-to-DC converter and adapted to provide impedance matching between the antenna and the RF-to-DC converter, and an RF load/matching circuit coupled to the RF-to-DC converter and adapted to block the RF power from reaching an output terminal of the RF-to-DC converter;

The recovery unit, in accordance with one embodiment, further includes, in part, a digital control block adapted to generate control signals for the recovery unit and to provide communication/control signals to a device receiving the DC power, and an analog-to-digital converter adapted to convert the output of the amplitude/power detector to a digital signal. The recovery unit, in accordance with one embodiment, further includes, in part, a digital control block adapted to generate control signals for the recovery unit, and a transceiver adapted to communicate with a device receiving the DC power.

A method of generating a DC power using RF power, in accordance with one embodiment of the present invention, includes, in part, measuring an amount of power being received by a device generating the DC power, and controlling the phases of the RF waves being transmitted by a multitude of RF transmitters in accordance with the measured power. In one embodiment, the method further includes, in part, varying a programmable load at the device to measure the received power or to increase the dynamic range with which the received power is measured..

DETAILED DESCRIPTION OF THE INVENTION

Figure 1:
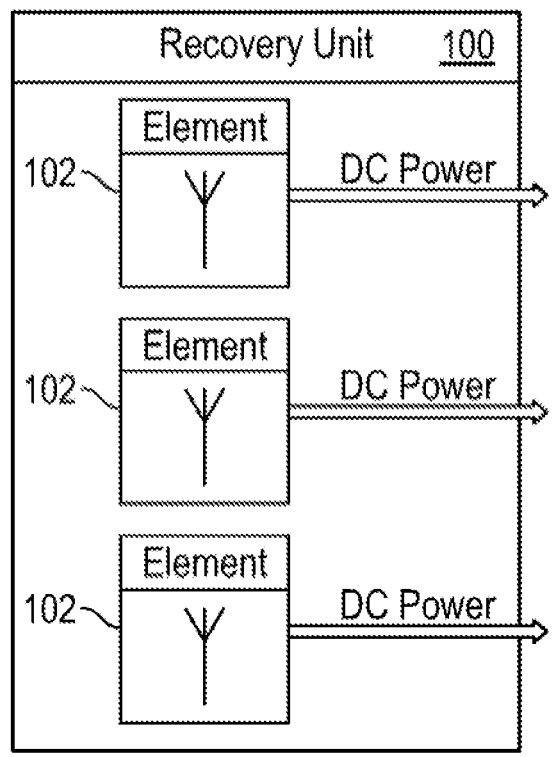
FIG. 1 is a block diagram of a recovery unit adapted to charge a device from incident electromagnetic waves, in accordance with one embodiment of the present invention.

FIG. 1 is a block diagram of a recovery unit (RU) 100 adapted to charge a device from incident electromagnetic waves, such as radio frequency (RF) waves, in accordance with one embodiment of the present invention. RU 100 is shown as including a multitude of recovery elements 102 each of which includes an antenna to receive the radio frequency waves and an RF-to-DC converter that converts the radio-frequency power, i.e., the RF power to a direct-current (DC) power. Each recovery element 102 may further include an impedance matching circuit(s) and/or impedance transformation circuits to improve the power transfer from the RF input to the RF-DC converter and/or to improve the conversion efficiency from RF power to DC power. The matching circuit may change and/or convert the load seen at DC, the RF frequency and/or its harmonics. FIG. 1 of application Ser. No. 14/552,249 is a more detailed schematic diagram of an RU element 102 adapted to convert an electromagnetic wave received via the antenna to a DC power.

Figure 2:
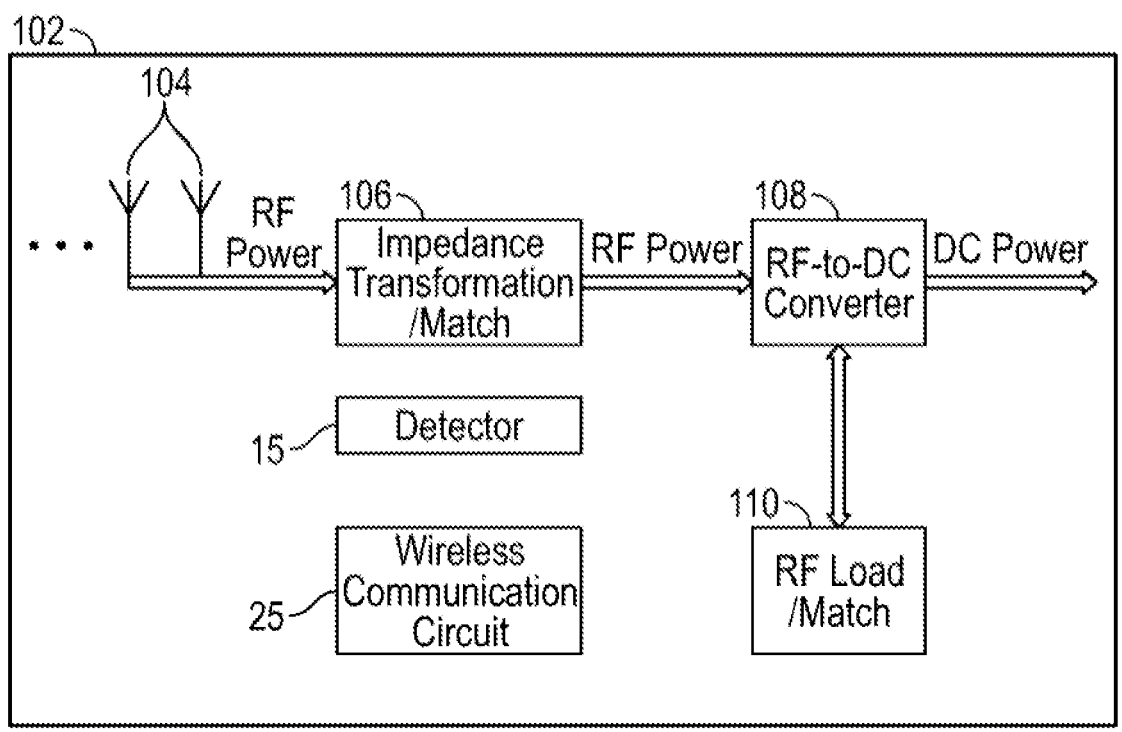
FIG. 2 is a block diagram of a recovery element disposed in the recovery unit of FIG. 1, in accordance with one exemplary embodiment of the present invention.

FIG. 2 is a block diagram of a recovery element 102 in accordance with one exemplary embodiment of the present invention. Recovery element 102 is shown as including one or more antennas 104 receiving the RF waves, an impedance transformation/matching element 106 adapted to improve the power transfer and/or the conversion efficiency from RF power to DC power, an RF-to-DC converter 108 adapted to convert the RF power to a DC power, a detector 15 adapted to detect a signal in response to a presence of a living organism positioned in the path of the received RF signal, a wireless communication circuit 25 adapted to cause an RF signal generating unit to vary a power of the RF signal in accordance with the deteted signal, and an RF load/matching circuit 110 adapted to provide a known impedance at the RF frequency and/or its harmonics. Each antenna 104 may be a printed-circuit board (PCB) patch antenna or other suitable antenna such as ceramic patch antennas WLP.2450.25.4.A.02 or WLP.4958.12.4.A.02 commercially available from Taoglass (www.taoglass.com). RF-to-DC converter 108 may be any circuit that converts an RF signal to a DC signal, such as Schottky diodes bearing model number HSMS-270C-TR1G, commercially available from Avago Technologies, or Schottky diodes bearing model number SMS3925-079LF commercially available from Skyworks Solutions Inc. RF load matching circuit 110 may include capacitors, inductors, resistors adapted to match the impedance of the RF-to-DC converter 108.

Figure 3A:
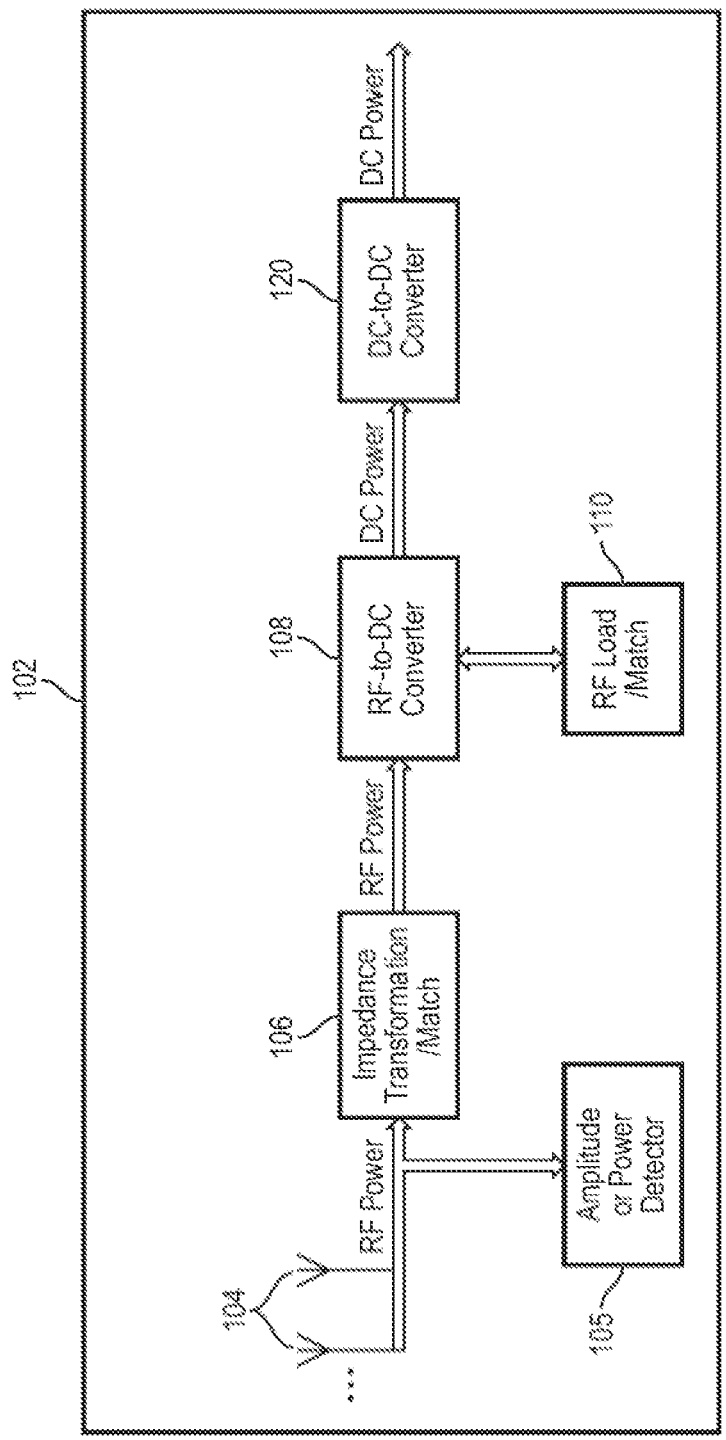
FIGS. 3A-3E are exemplary block diagrams of a recovery element in accordance with some embodiment of the present invention.

FIG. 3A is a block diagram of a recovery element 102 in accordance with another exemplary embodiment of the present invention. Recovery element 102 is shown as including, in part, one or more antennas 104 receiving the RF waves, an impedance transformation/matching element 106, an RF-to-DC converter 108 adapted to convert the RF power to a DC power, and an RF load/matching circuit 110, as described above in connection with FIG. 2. Recovery element 102 of FIG. 3A is also shown as including, in part, a DC-to-DC converter 120, and an amplitude/power detector 105. DC-to-DC converter 120 is adapted to convert and control the DC voltage or current supplied by RF-to-DC converter 108 to a fixed or variable value. The RF-to-DC converter may include any electronic circuit that converts RF power to DC power. In one embodiment, a Schottky or other diodes may be used to convert the RF power to a DC power.

Amplitude/power detector 105 is adapted to facilitate measurement of the received and/or converted power. Amplitude/power detector 105 may be implemented using, for example, a directional coupler that siphons off a known, small fraction of the incoming power for measurement together with an RF-to-DC conversion circuit (e.g. a diode or a transistor mixing circuit) such that the amount of DC output voltage is related to the siphoned-off power and hence to the incoming RF power. RF-to-DC converter 120 may be adapted to implement power detection functionality if, for example, its DC output voltage is measured and converted to an output power for a known DC load resistance. The DC load resistance may be provided by the input resistance of one or more DC-to-DC converters (which can optionally be switched in or out) and/or optional programmable test loads that include, for example, resistors connected to the RF-to-DC converter output via switches. The DC-to-DC converter converts the received power dependent DC output voltage to a fixed output voltage for powering a device. DC-to-DC converter 120 is commercially available from a number of suppliers, such as Intersil under model number ISL9111AEHADJZ Boost converter, or Texas Instruments under model number TPS61030PWPR Boost converter.

Figure 3B:
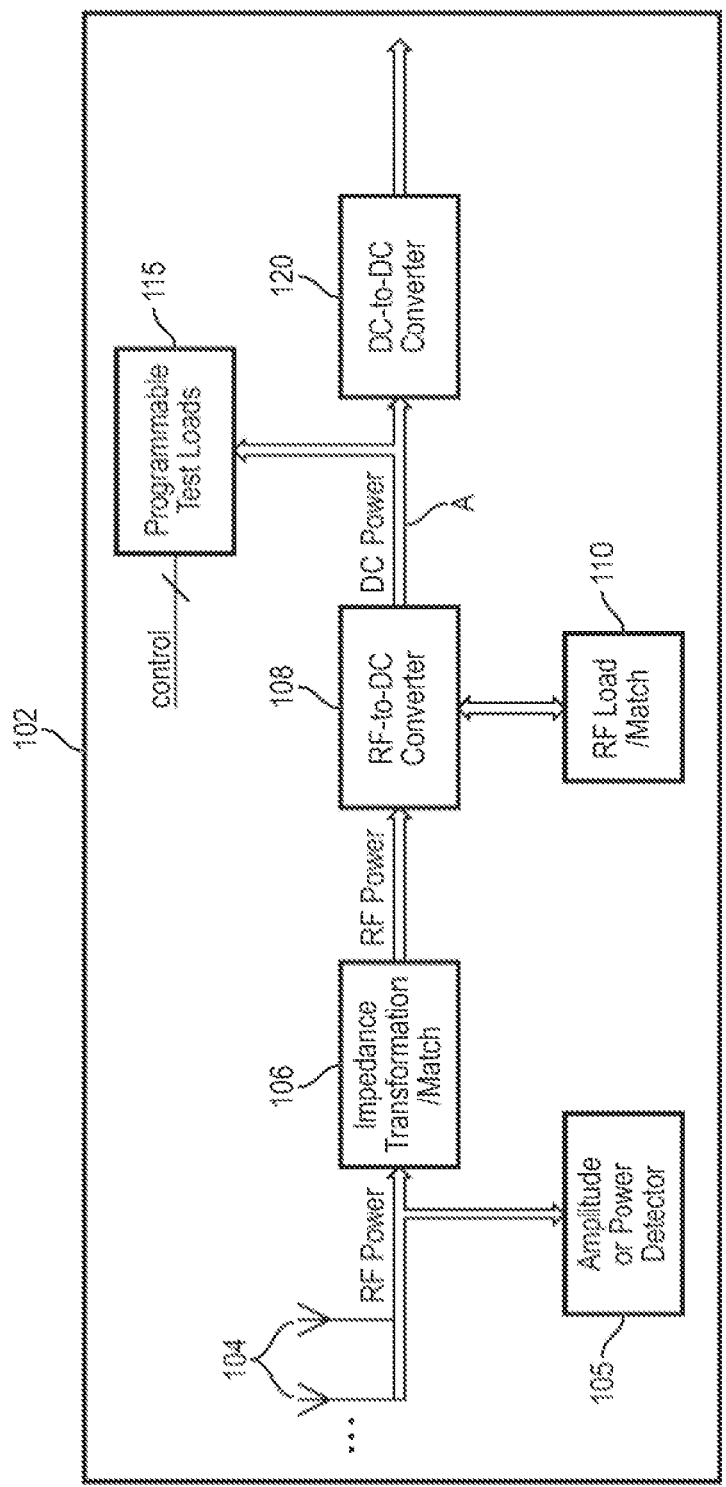

FIG. 3B is a block diagram of a recovery element 102 in accordance with another exemplary embodiment of the present invention. The recovery element shown in FIG. 3B is similar to that shown in FIG. 3A except that the recovery element shown in FIG. 3B includes a programmable test load unit 115. Programmable test load unit 115 is adapted to determine the optimal load impedance to be driven, or circuitry to measure the received power, or circuitry to directly measure the converted power.

Figure 11:
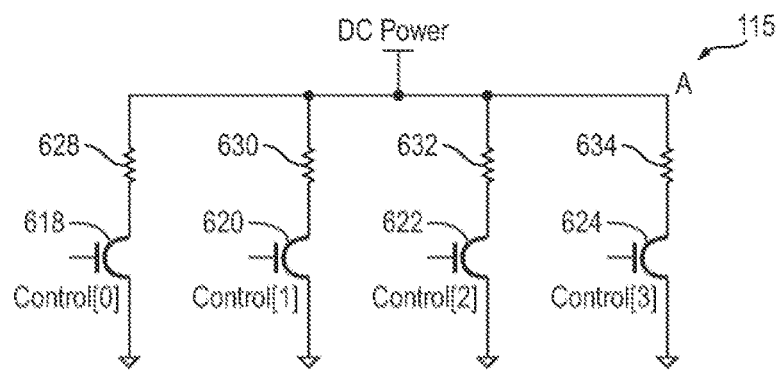
FIG. 11 is a more detailed schematic diagram of an exemplary embodiment of programmable test load.

FIG. 11 is a more detailed schematic diagram of an exemplary embodiment of programmable test load 115. Programmable test load 115 is shown as including 4 resistors 628, 630, 632, 634 and 4 transistor switches 618, 620, 622, and 624 that are respectively controlled by bits control[0], control[1], control[2], and control[3] of signal Control[0-3] generated by a digital control block as described further below. By controlling the number of transistors that are on at any given time, the resistance between node A and the ground potential may be varied. Switching in different loads provides for testing whether sufficient power is being supplied (when most/all transistors are switched in) as well as detecting when a relatively smaller power is received (when most transistors are switched off.

Figure 3C:
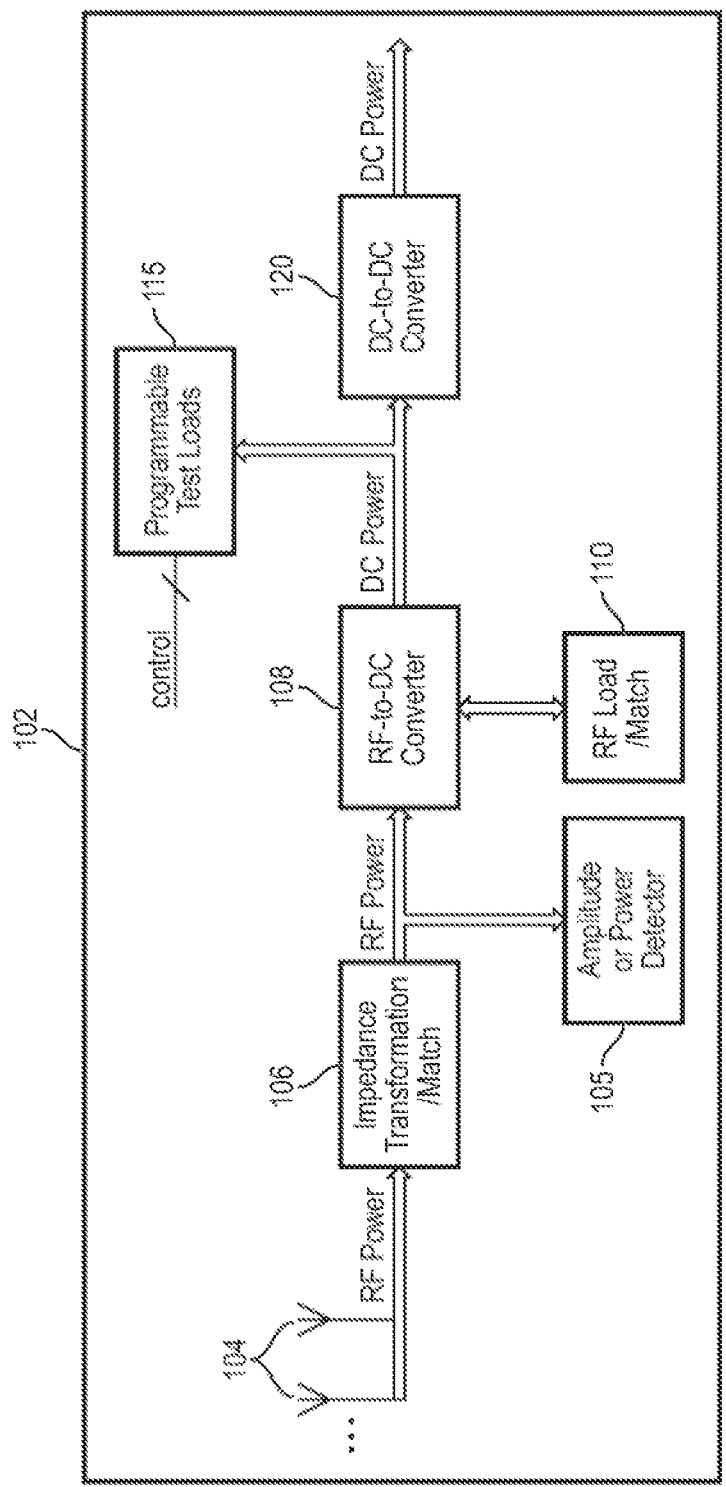

FIG. 3C is a block diagram of a recovery element 102 in accordance with another exemplary embodiment of the present invention. The recovery element shown in FIG. 3C is similar to that shown in FIG. 3B except that in the recovery element shown in FIG. 3C, amplitude/power detector 105 is coupled to the input of RF-to-DC converter 108. Other embodiments of the recovery element shown in FIG. 3C may or may not include a programmable test load unit 115.

Figure 3D:
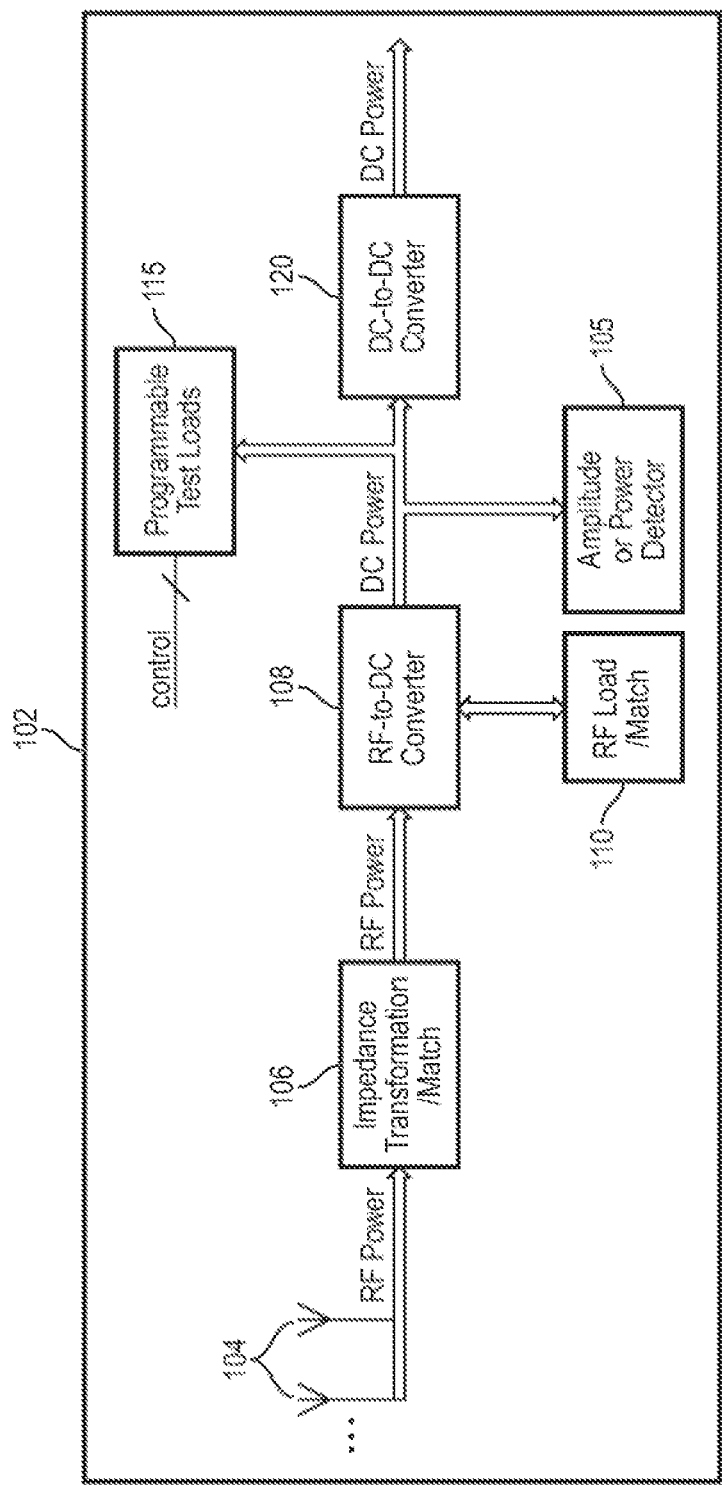

FIG. 3D is a block diagram of a recovery element 102 in accordance with another exemplary embodiment of the present invention. The recovery element shown in FIG. 3D is similar to that shown in FIG. 3B except that in the recovery element shown in FIG. 3D, amplitude/power detector 105 is coupled to the output of RF-to-DC converter 108. Other embodiments of the recovery element shown in FIG. 3D may or may not include a programmable test load unit 115.

Figure 3E:
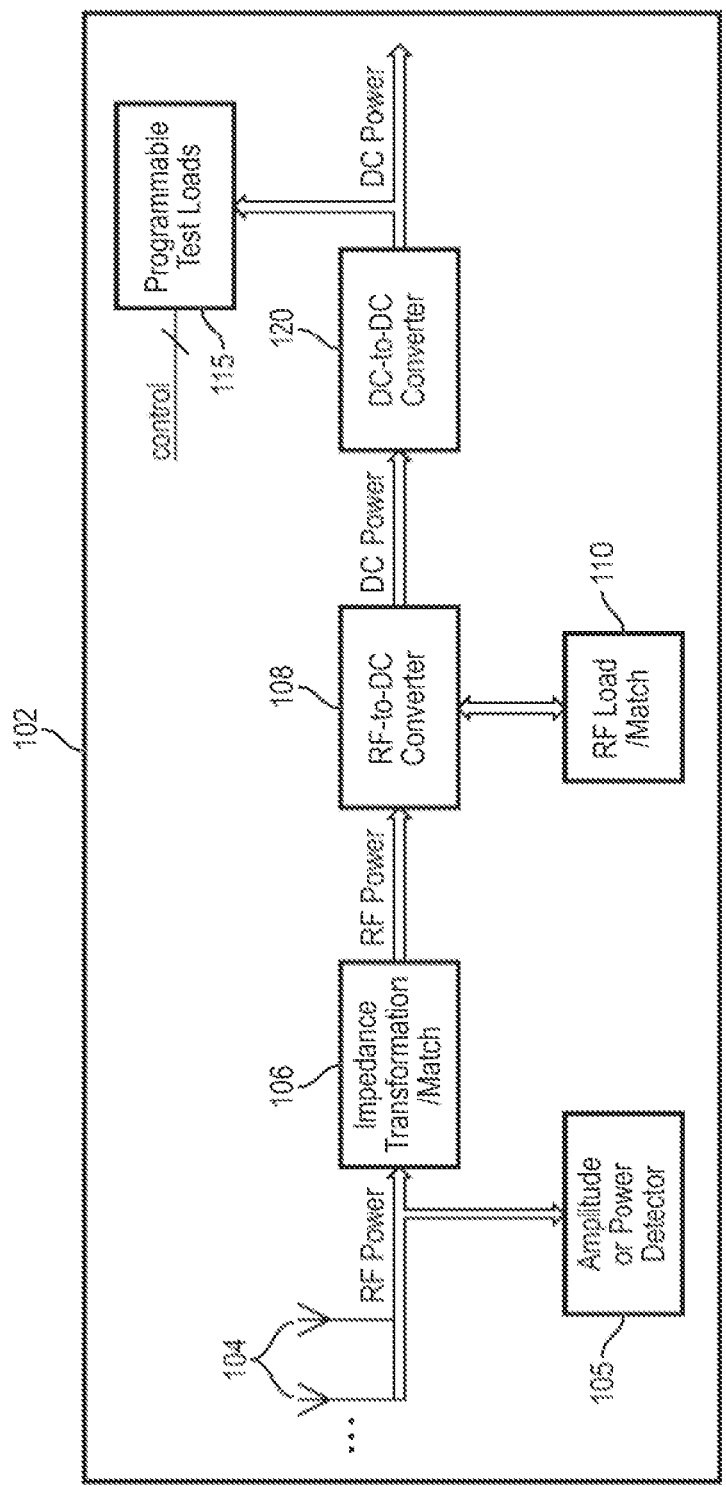

FIG. 3E is a block diagram of a recovery element 102 in accordance with another exemplary embodiment of the present invention. The recovery element shown in FIG. 3E is similar to that shown in FIG. 3B except that in the recovery element shown in FIG. 3E, programmable test load unit 115 is coupled to the output of DC-to-DC converter 120. In other embodiments of the recovery element shown in FIG. 3E, amplitude or power detector 105 may be coupled to the input of RF-to-DC converter 108 (as shown in FIG. 3c), or to the output of RF-to-DC converter 108 (as shown in FIG. 3D). Other embodiments of the recovery element shown in FIG. 3E may or may not include an amplitude/power detector 105.

A number of recovery units may be coupled to one another in order to combine the received and recovered power. The recovery units may be coupled to one another in series so as to add their voltages, or in parallel so as to add the currents they generate, as described further below.

In order to facilitate and control power detection, to control the power conversion process and/or to facilitate communication with one or multiple power generation units (i.e., RF power transmitter and alternatively referred to herein as GUs), digital signal processors, microcontrollers, microprocessors, application-specific integrated circuits (ASICs), or custom digital logic circuits such as field-programmable gate-arrays (FPGAs) and/or analog-to-digital converters may be used. Communication protocols over one or more wireless channels with the GU or GUs can be implemented using any of the popular WiFi protocols (IEEE 802.11 a/b/g/n/ac or similar), Bluetooth, Zigbee and/or custom protocols, and the like either in existence or developed in the future.

Many of the existing consumer electronics, such as such as hand-held tablets, laptop computers or cellular telephones, include circuitry adapted to communicate with a GU(s) transmitting RF waves. Such devices also often include communication interfaces, such as Universal Serial Bus (USB), that may be used to establish communication between the device and a controller disposed in the RU. Furthermore, communication between the recovery unit and the device to be powered can be established via a USB port or any other power connection used to charge/power the device. An application program or an operating system, among others, may also be used to establish, control and/or bridge communication between the GU and/or the RU. Accordingly, in some embodiments, the device-to-be-charged includes the RU(s). In yet other embodiments, the RU is a stand-alone deice that may supply the RF-to-DC converted power via a port, such as a USB port, to a device to be charged.

Figure 4:
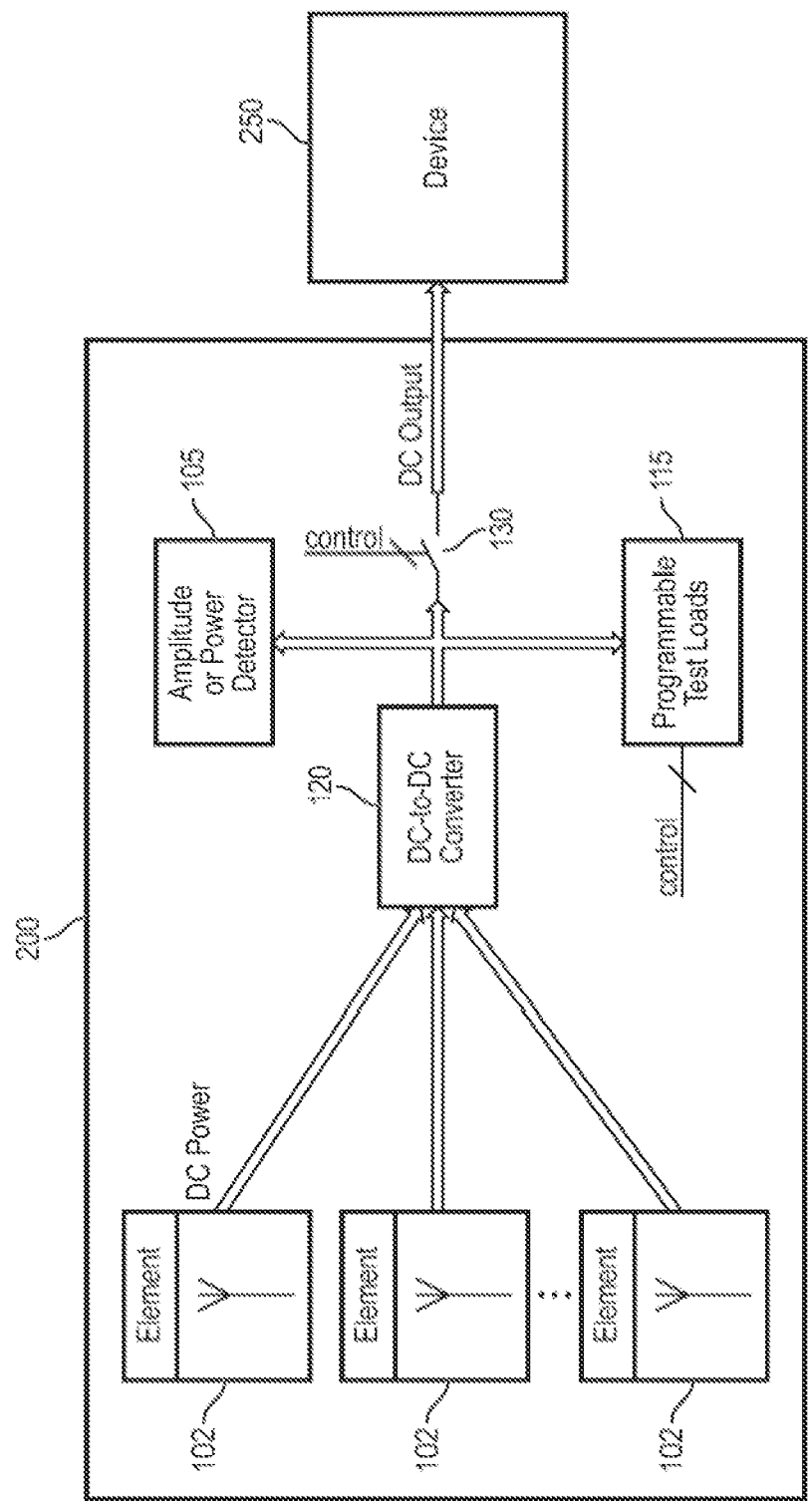
FIG. 4 is a block diagram of a recovery unit, in accordance with another exemplary embodiment of the present invention.

FIG. 4 is a block diagram of a recovery unit 200, in accordance with another exemplary embodiment of the present invention. Recovery unit 200 is shown as including a multitude of recovery elements 102 that are coupled to one another in parallel. Each recovery element 102 receives wireless power from the GU(s) (not shown) and converts the received power to a DC power. The current generated by the recovery elements are added to each other and supplied to DC-to-DC converter 120, which in turn, converts the DC voltage corresponding to the combined current to a desired value.

A programmable test load 115 coupled to the output of the DC-to-DC converter is used to connect various test loads to ensure sufficient power is delivered to the output and improve the sensitivity of the power detector. For example, different test loads may include resistors of different resistivity dissipating different amounts of power when a nearly constant voltage or current is supplied to them. Small amounts of dissipated power may be allowed to detect faint or weak power transfer such as when the device is first receiving power. Relatively larger amount of power may be dissipated when the device is receiving more power from the generation unit(s) as the generation unit is better adapted to sending power to the device. The amount of power that can be dissipated may be determined in such a fashion as to ensure that sufficient power is available to satisfy different requirements or standards, e.g. the number of so-called USB power "unit loads". Amplitude/power detector 105 is adapted to measure the output voltage generated by the DC-to-DC converter and delivered to the programmable test load. Furthermore, by varying the amount of load supplied by programmable test load 115, the maximum deliverable power can be determined.

Optional switch 130 is adapted to control power delivery from the RU 200 to the device 250 being powered. In one embodiment, each recovery element 102 has one or more antennas and an RF-to-DC converter. In yet other embodiments, each recovery element 102 has one or more antennas, an RF-to-DC converter, an impedance matching/transformation circuit, and a RF load matching circuit, as shown in FIG. 2. Accordingly, RU 200 is adapted to receive power wirelessly, convert the received power to a predefined DC power, measure the maximum receivable power using the power detector and test loads, (4) communicate the maximum amount of power received under optimal load conditions to the GU(s) to enable the GU(s) to direct more power to the RU, and connect the device to be powered after it has been determined that sufficient power is available and has been directed from the GU(s). Although not shown in FIG. 4, it is understood that a digital processor such as a microcontroller, a digital-signal-processor, a custom programmed field-programmable gate array (FPGA) or a central processing unit (CPU), among others, may be used to control the operations of the RUs, as described further below.

Figure 5:
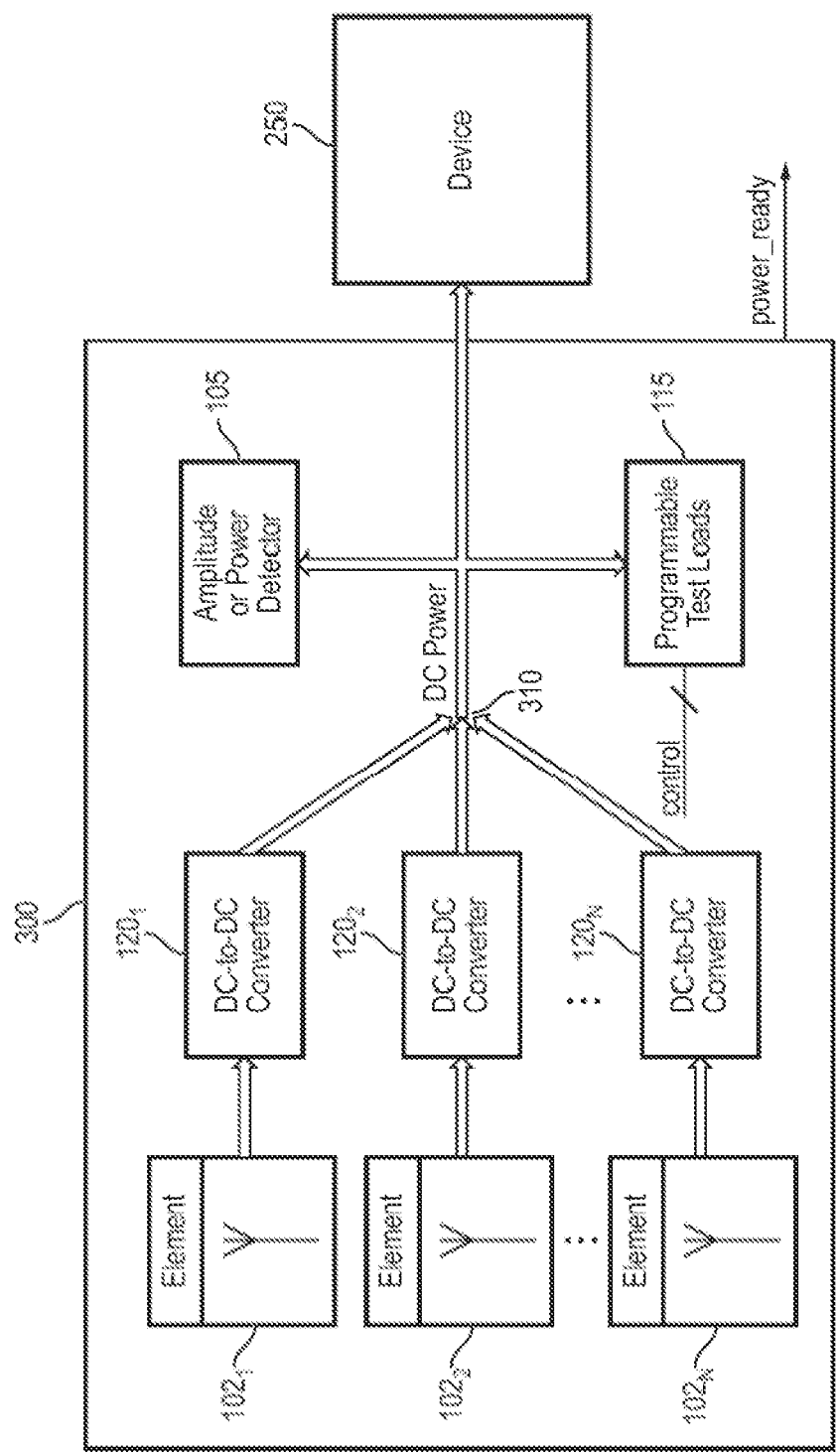
FIG. 5 is a block diagram of a recovery unit in accordance with another exemplary embodiment of the present invention.

FIG. 5 is a block diagram of a recovery unit 300, in accordance with another exemplary embodiment of the present invention. Recovery unit 300 is shown as including a multitude of recovery elements 102 that are coupled to one another in parallel. Each recovery element 102, (i is an integer ranging from 1 to N) receives wireless power from the GU(s) (not shown), converts the received RF power to a DC power and delivers the converted DC power to an associated DC-to-DC converter 120. Each DC-to-DC converter 120, is adapted to convert the DC power it receives, and deliver a corresponding current to node 310. The currents so delivered are added at node 310 and supplied to device 250 being charged. Programmable test load 115 and amplitude/power detector 105 operate in the same manner as described above. Although not shown, some embodiments may further include power flow control elements, such as diodes, switches or other suitable circuitry to facilitate the action of the converters, isolate the elements and/or the converters from one another or for other purposes. Such power flow control elements may be coupled to node 310 of RU 300.

Programmable test loads 115 and amplitude/power detector 105 may be used, among other things, to optimize the converted power, determine suitable information such as the maximum available power to be sent back to the GU(s), determine changes in the received power (for example to determine the presence, appearance and/or disappearance of interference from objects and/or living organisms). RU 300 is also shown as generating an optional Power_Ready signal that signals when the power is ready to be delivered. As in the other embodiments described above, the various control signals and algorithms may be implemented using application-specific integrated circuits (ASICs), commercially available CPUs and/or microcontrollers, DSP units, or any combinations thereof.

Figure 6:
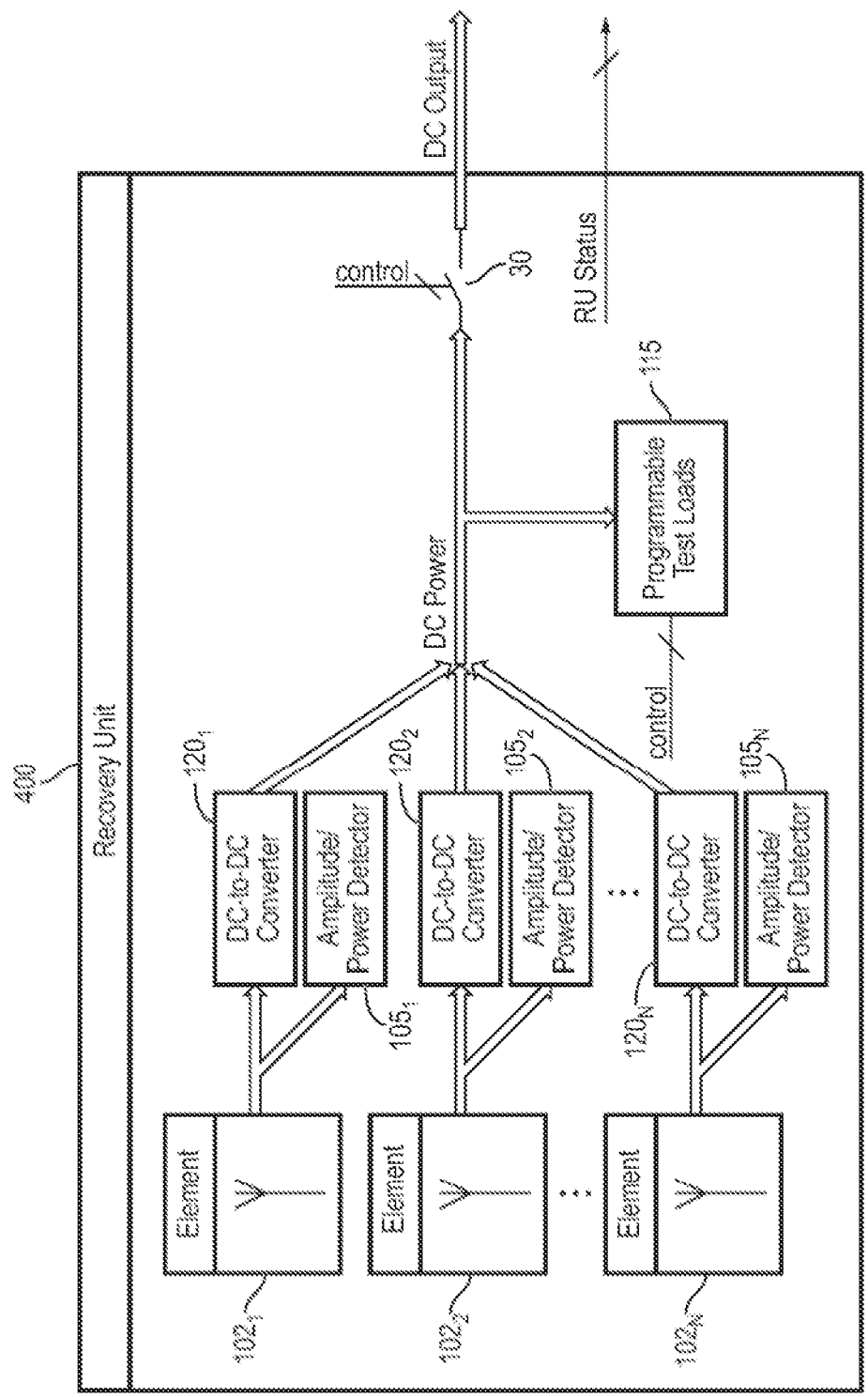
FIG. 6 is a block diagram of a recovery unit in accordance with another exemplary embodiment of the present invention.

FIG. 6 is a block diagram of a recovery unit 400, in accordance with another exemplary embodiment of the present invention. Recovery unit 400 is shown as including N recover elements $102_1 \ldots 120_N$, where N is an integer greater than one. Recovery unit 400 is also shown as including a programmable test load unit 115 and a switch 30, as described above. Each recovery element 102, (i is an index varying from 1 to N), has an associated DC-to-DC converter 120, and an associated amplitude/power detector $105_i$. Accordingly, the RF power received and converted by each recover element as well as the total power received may be determined. This provides a number of advantages, such as determining the location of maximum available wireless power, detecting the movement of the RU within the relative vicinity of the region where wireless power is being delivered to, detecting the movement of interfering objects and/or living organisms as they move across or into and/or out of the vicinity of the region where wireless power is being delivered to, detecting loss of power while maintaining a nearly constant output voltage and/or power to initiate appropriate action (e.g., transmit signal to the device-to-be-powered that power loss is imminent, and/or transmit a signal to the GU(s) to adjust the location of wireless-power delivery), among others. As described above, the algorithm controlling the above operations may be implemented using a digital signal processor, CPUs, microcontrollers, analog-to-digital converters (ADCs), digital-to-analog converters (DACs), and the like.

Figure 7:
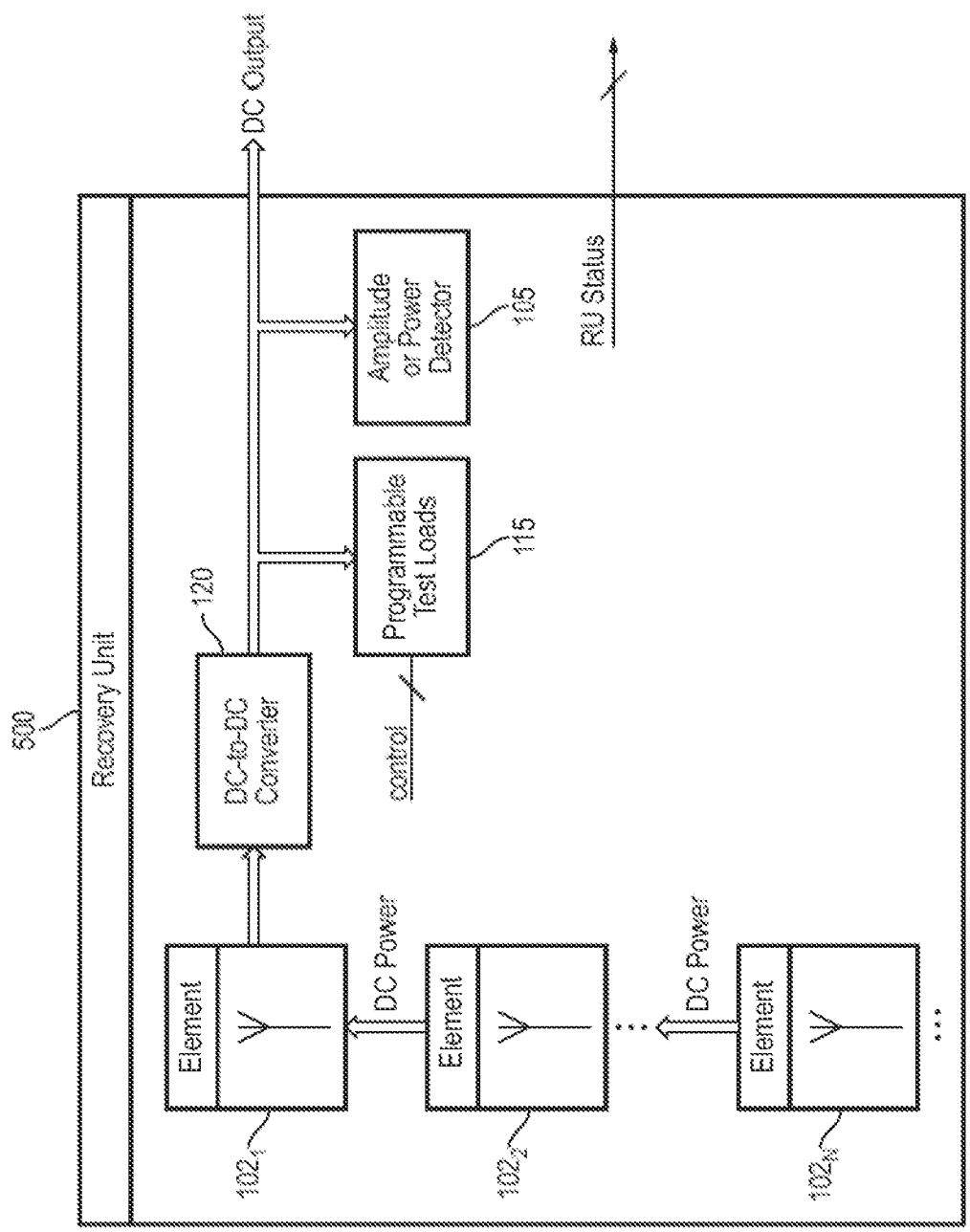
FIG. 7 is a block diagram of a recovery unit in accordance with another exemplary embodiment of the present invention.

FIG. 7 is a block diagram of a recovery unit 500, in accordance with another exemplary embodiment of the present invention. Recovery unit 500 is shown as including N recover elements $102_1 \ldots 120_N$ where N is an integer greater than one, and DC-to-DC converter 120. Recovery unit 400 is also shown as including a programmable test load unit 115, and an amplitude/power detector 105. Recovery element $102_i$ (i is an index varying from 1 to N), are coupled to one another in series. Accordingly, for example, the output of recovery element $102_N$ is coupled to recover element $102_{N-1}$, the output of recovery element $102_{N-1}$ is coupled to recover element $102_{N-2}$, and the output of recovery element $102_2$ is coupled to recover element $102_1$. The output voltage of recovery element $102_1$ is applied to DC-to-DC converter 120. Because the recovery elements are coupled to one another in series, a relatively higher voltage is supplied to DC-to-DC converter 120. Programmable test load unit 115 and amplitude/power detector 105 operate in the same manner as described above.

Figure 8:
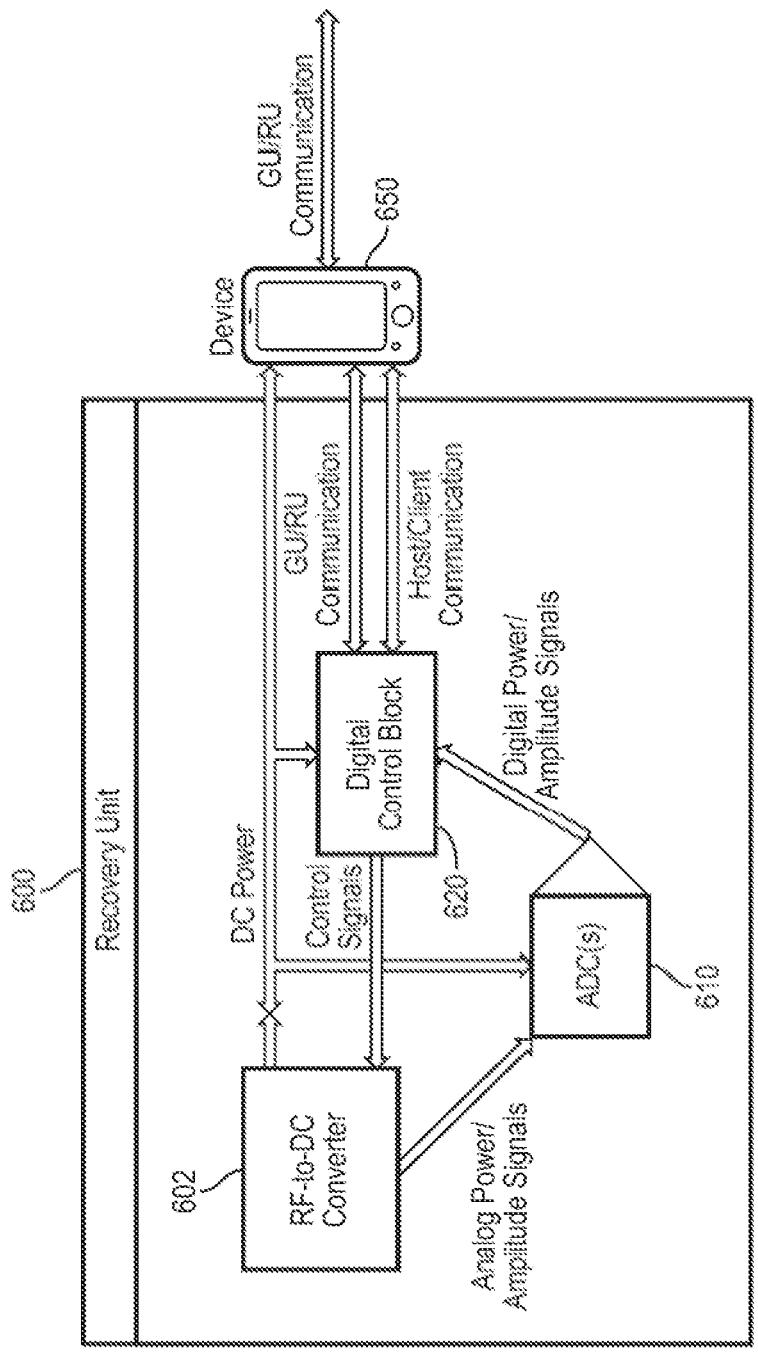
FIG. 8 is a block diagram of a recovery unit in accordance with another exemplary embodiment of the present invention.

FIG. 8 is a block diagram of a recovery unit 600, in accordance with another embodiment of the present invention. Recovery unit 600, which may correspond to any of the recovery units described above, is adapted to charge device 650. RF-to-DC converter block 602 is adapted to convert the RF power to a DC power and may include one ore antennas, an impedance transformation/matching block, an RF-to-DC converter, a DC-to-DC converter, an amplitude/power detector, and an RF load matching circuit, as described above in reference to any of the various embodiments of the recovery units, as described above.

Analog-to-digital converter ADC(s) 610 is adapted to convert the information received from the amplitude/power detector disposed in the RF-to-DC converter block 602 to a digital data for use by a digital control block that may include a microprocessor, central processing unit (CPU), digital-signal processor (DSP) unit, microcontroller, custom integrated control circuit, application-specific integrated circuit (ASIC), field-programmable gate array (FPGA), or other suitable hardware or any combination thereof. Digital control block 620 is configured to control the programmable (configurable) test load unit disposed in the RF-to-DC converter 602 to determine the amount of available, received and/or converted RF power and/or communicate this information to device 650 and/or with the RF power transmitter(s), also referred to herein as a generating unit(s) (GU(s)).

Device 650 may be a smart-device such as a portable tablet computer, a smart phone, a laptop computer or similar Device 650 includes hardware/software components to communicate with the GU (not shown) over a wireless interface. Examples of such interfaces are WiFi, Bluetooth, Zigbee and/or any other custom physical wireless hardware that could be part of such devices in the future to enable the device to communicate wirelessly with the GU(s). In this exemplary embodiment, RU 600 transmits information to and receives information from the GU through device 650. Furthermore, RU 600 may receive DC power initially from device 650 to enable initial operations while wireless power is being steered towards it and before sufficient power is available through wireless means. Examples of interfaces that enable both information and power-flow are the Universal-Serial-Bus (USB) interface or Apple™' proprietary data/power interfaces (e.g. Lightning"), but other interface either in existence or developed in the future may also be used.

After being connected to device 650, exemplary RU 600 receives DC power from device 650 and begins to cause a signal to be transmitted in order to make the GU aware of its presence. The GU then directs power towards RU 600 while RU 600 continues to communicate with the GU via device 650. When a sufficient amount of power is received by RU 600, RU 600 begins to transfer the received power to device 650. RU 600 continues to monitor the received power and adapts to changing circumstances such as a drop in power, movement, appearance and/or disappearance of interfering objects and/or living organism, among others. RU 600 may also transmit such information to device 650. Such adaptive behavior, for example, may include discontinuing power transfer when a living organism is detected or when the device is deemed out of range (e.g. due to the appearance of an interfering object). In one embodiment, in order for RU 600 to interface with device 650, device 650 may be prompted to run a user initiated application program. Alternatively, interface software may be implemented in the device 650's operating system to establish communication with RU 600.

Other information that may be exchanged between RU 600 and the GU(s) are identifying information, communication handshakes, communication from and to several GUs to facilitate hand-off, signals to establish synchronized operation, timing information, information regarding detected interference from objects and/or living organism(s), firmware updates, and the likes. The GU(s) may also serve as a WiFi access point and thus provide routing services to WiFi enabled devices.

Figure 9:
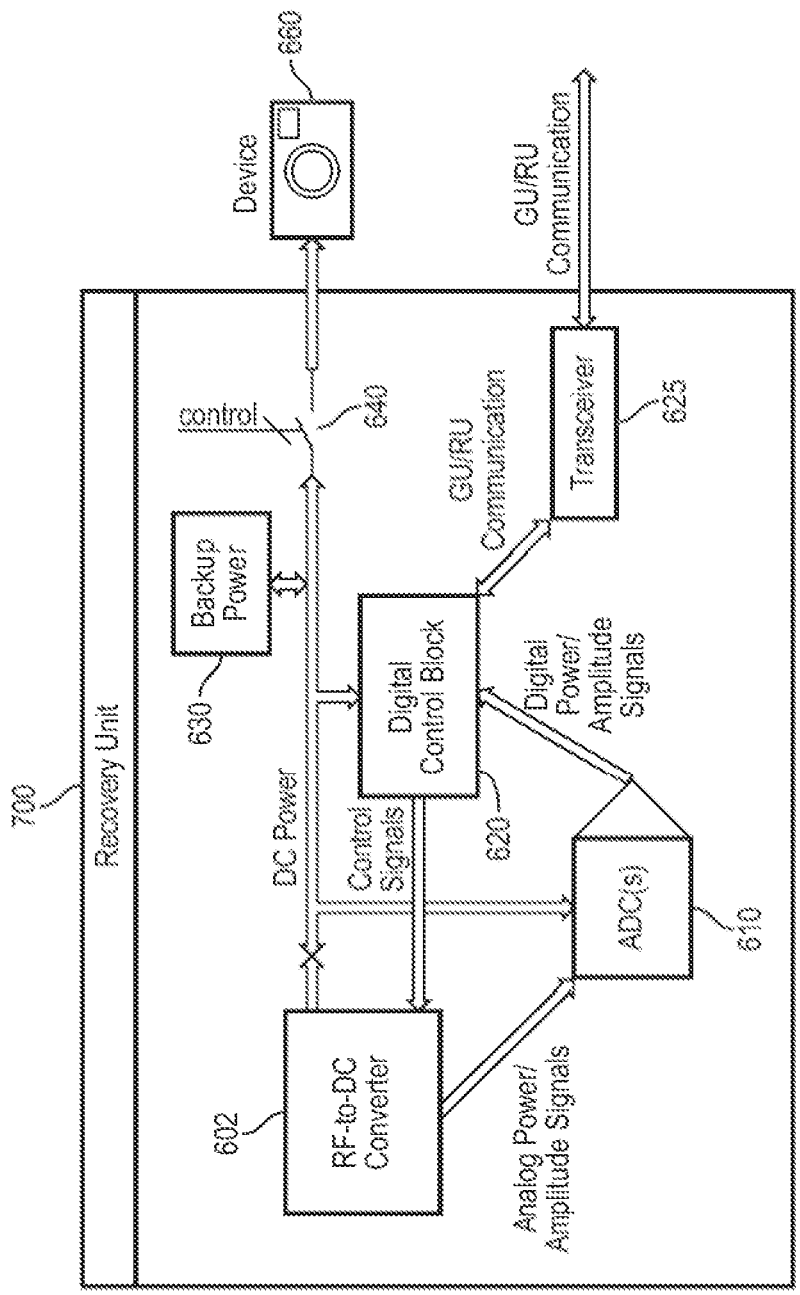
FIG. 9 is a block diagram of a recovery unit in accordance with another exemplary embodiment of the present invention.

FIG. 9 is a block diagram of a recovery unit 700, in accordance with another embodiment of the present invention. Recovery unit 700 is adapted to power a device 660 that includes only a power interface. RU 700 is similar to RU 600 except that RU 600 also includes one or more transceiver(s) 625, a back-up power unit 630 and a switch 640. Transceiver 625 is adapted to communicate with device 660, which only has an interface for transferring power, i.e., it does not have an interface for transferring other data/commands. Back-up power source 630 is adapted to temporarily power RU 700 until RU 700 starts to wirelessly receive power from the GU and deliver that power to device 660.

Analog-to-digital converter ADC(s) 610 is adapted to convert the information received from the amplitude/power detector disposed in the RF-to-DC converter block 602 to a digital data for use by a digital control block that may include a microprocessor, central processing unit (CPU), digital-signal processor (DSP) unit, microcontroller, custom integrated control circuit, application-specific integrated circuit (ASIC), field-programmable gate array (FPGA), or other suitable hardware or any combination thereof. Digital control block 620 is configured to control the programmable (configurable) test load unit disposed in the RF-to-DC converter 602 to determine the amount of available, received and/or converted RF power and/or communicate this information to device 660 and/or with the RF power transmitter(s), also referred to herein as a generating unit(s) (GU(s)).

When recovery unit 700 is sufficiently powered, the backup power source 630 may be disconnected, and RU 700 is powered directly from the RF waves it receives. If backup power source 630 is rechargeable, both power source 630 and device 660 may be concurrently recharged using the received RF power.

Other information that may be exchanged between RU 600 and the GU(s) are identifying information, communication handshakes, communication from and to several GUs to facilitate hand-off, signals to establish synchronized operation, timing information, information regarding detected interference from objects and/or living organism(s), firmware updates, and the likes. The GU(s) may also serve as a WiFi access point and thus provide routing services to WiFi enabled devices.

Figure 10:
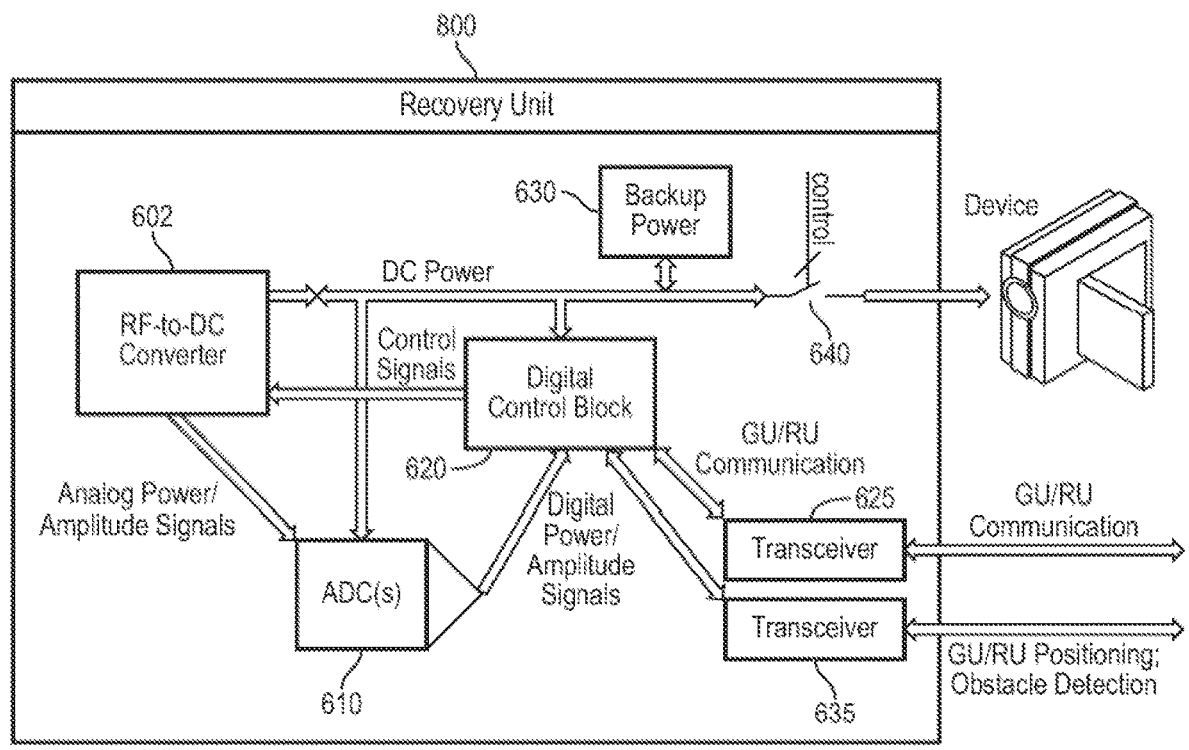
FIG. 10 is a block diagram of a recovery unit in accordance with another exemplary embodiment of the present invention.

FIG. 10 is a block diagram of a recovery unit 800, in accordance with another exemplary embodiment of the present invention. Recovery unit 800 is similar to recovery unit 700 except that recovery unit 800 includes a second transceiver 635 adapted, among other things, to facilitate directing wireless RF power to the RU. Transceiver 635 may achieve this by acting, for example, as a beacon to transmit a beacon tone at one or several known frequencies. The GUs may use the phase information of the received beacon tone(s) to determine transmission phases more quickly and/or more accurately to direct power to the RU. In addition, if a known beacon power is transmitted, the GU may determine from the received beacon power whether, for example, there are objects and/or living organisms interfering with the power transfer, or whether the RU is close-by, far away, moving, and the like.

One method to control wireless power transfer is to control the GU elements according to preexisting knowledge and/or heuristics such as by using previously calibrated lookup tables, calculated values based on the GU element and antenna geometry, and the like. Such pre-existing or calculated knowledge may be used to direct wireless power towards known locations (assuming a physical environment that is similar to the one used during calibration). For example, a factory or initial use-case calibration can provide the GU element programming values that will concentrate power in known locations in the physical environments, characterized by geometric measures such as angles (e.g. azimuth and elevation) and distance from the GU. Sending wireless power from the GU to an RU may then be accomplished by having the RU transmit its location either via beacons, as global-position system (GPS) coordinates, or in any other suitable format, so that the GU can determine where the RU(s) is (are) located relative to itself, and further determine which one of the known GU element programming values and phases best transfer power to the RU(s).

Predetermined programming values may also be used to perform a scan of the physical environment for RU(s), sources of interference such as objects and/or living organisms, among others. The scan could be complete or partial. If the RUs are present, such a scan could be used to determine the best or a sufficient set of GU programming parameters, either as a starting point for further improvement of the wireless power transfer efficiency or as a (temporary) operational point. The RUs in this case would then send feed-back signals regarding the received and/or converted wireless power to the generation unit(s). The GU(s) may use this information alone or in combination with other parameters, such as knowledge of the total transmitted power (which may vary, particularly when amplitude control is available), total consumed power (which cannot be lower than total transmitted power) or a combination thereof to arrive at various figures-of-merit (FOM) for the wireless power link, such as transfer efficiency, and use these to optimize the wireless power link based on these figures, and/or determine whether the link is sufficient using these FOMs as a base for deciding.

Other methods for steering the wireless power to a desired location(s) include using the information about the received and/or converted power by the RUs as input to the steering algorithms being used to control the GU. One exemplary steering algorithm assumes that a good, if not an optimal, point can be reached by varying the phases of the GU elements to follow a path of increased power transfer to the RU in a continuous and/or discrete fashion. A starting point for this algorithm may be chosen randomly, based on a previous search, for example, by a scan or as the result of a previous search based on another or the same method, or by any other suitable means. The algorithm would then improve the steering of wireless power to the RU(s) by continuously or discretely applying sufficiently small changes to the phases of the RF waves being transmitted or other programming parameters and comparing the resulting change in received and/or converted power in the RU. For this purpose, the RU continuously provides such information, either in an "open-loop" fashion such that the GU can match changes in values to the corresponding changes on the GU programming parameters, or in a "closed-loop" fashion such that the RU can receive information regarding changing programming parameters on the GU side and respond with information regarding changes in received and/or converted power.

Many methods for stepping through these changes in programming parameters exist. Adjusting these parameters based on such result(s) to arrive at a sufficient and/or optimal performance level may be performed using any number of optimization techniques. In one exemplary implementation, the phase of some or all of the GU elements is adjusted by a small amount in either direction of its current value, and the resulting received and/or converted power at the RU is used to adjust the phase of the GU element accordingly. This algorithm thus transverses the parameter space in the form of an increased steering of wireless power transfer to the RU assuming that the relationship between the programmed GU parameters and the received and/or converted wireless power is not one-to-many (i.e. that the same GU parameter setting results in the same power transfer).

In certain instances, the system may be assumed to have a memory, i.e. that the resulting wireless power transfer is a function of the current as well as the past programming parameters. In such cases, a known starting point and complete programming history can be used as the programming parameters. For example, in one such case, the GU may be started from no output power, preprogramming all full power programming parameters, and then switching on and/or ramping the GU element power in a predetermined fashion so that each set of programming parameters corresponds to a single set of system history (and assuming that no-power starting case erases all memory in the system). Many other well-known optimization algorithms, such as the Nelder-Mead algorithm that employ the parameter to be optimized as the only required input, may be used.

In another embodiment, the algorithm is modified using information regarding the effect of each of the changes, i.e. their gradient. Such gradient-based techniques adjust the programming parameters based on the rate-of-change around the current programming parameters, the most common of which is referred to as the Gradient Descent algorithm. In accordance with this algorithm, the change around the current programming parameters (i.e. the gradient) is determined by making small changes for each of the parameters. The next set of programming parameters is then determined by making the changes to the current programming parameters in the direction of the steepest gradient using a sufficiently small step-size which may be adjusted during the implementation of the gradient descent algorithm.

Referring, for example to FIG. 3B, the received/and or converted power detected by amplitude/power detector 105 at any value of load selected by programmable test load 115 is proportional to the sum of the squares of the detected amplitudes. A least-square optimization problem may be tackled using well-known least-square optimization algorithms such as the Gauss-Newton algorithm, the Levenberg-Marquardt algorithm or other suitable methods, which use the gradient or Jacobian of the function (by minimizing the negative of the sum of the detected power/square values). Any one of these algorithms may be applied multiple times to the steering problem using different starting points. These algorithm are particularly useful if a starting point close to an optimal point is chosen, such as can be determined by a previous scan, as described above with reference to the existence of multiple local maxima.

Furthermore, derivatives or approximations thereof may be used together with other techniques. For example, another well-known method is the Newton-Jacobian algorithm, which requires first and second derivatives of the objective function (power received/converted). These can be numerically approximated using the change in received/converted power by changing the programming parameters by a sufficiently small amount in each direction. The three values obtained can then be used to calculate approximations of first and second derivatives.

In accordance with another exemplary algorithm, the amplitude of some or all of the GU elements is changed in order to optimize the efficiency with which power is transferred from the GU(s) to the RU(s). For example, using element antennas on the GU and/or RU side with different polarizations can result in some elements contributing little to the wireless power transfer efficiency. Accordingly, transmission power from such antennas may be reduced or disabled to improve overall wireless power transfer efficiency. In another example, power transmitted to undesired locations can be reduced by changing the GU element amplitudes, also referred to as apodization. In yet another example, the amplitude of some or all of the GU elements, may also be varied based on values stored in one or more lookup tables. In yet another example, the Matlab™ function "fmincon", which can use several non-linear minimization algorithms, may be used to implement beam-steering towards the RU.

It is understood that the above embodiments of the present invention are not limited to any particular optimization method that uses received and/or converted wireless amplitude and/or power to steer the location of the wireless power transfer closer to the RU(s) and/or to an optimum point. It is also understood that the above techniques may further be refined by incorporating the information regarding the test-load used by the programmable test load block 115 (see, e.g., FIG. 3B). For example, at each point in the programming parameter space or after a series of steps through the space, the test-load can be varied as part of the steering algorithm.

Various stopping criteria can be used to terminate the algorithm and proceed with using the transferred power. At some point in the algorithmic search, sufficient power to power the device-to-be-powered is available, at which point the search can be stopped and the device can be connected so that the charging can begin. Alternatively, the device can be connected and the steering can be continued as the continued search/steering of wireless power towards the RU results in more available power. Another stopping criterion for the algorithm is to terminate when insufficient change in received/converted power is detected. When such a condition is detected, the algorithm may be run again from a different set of initial GU programming parameters to address the presence of possible multiple stationary points in the objective function (i.e. when several local maxima for received/converted wireless power exist).

Other sets of stopping criteria may be employed based on the environment the wireless power application is used in or changes in the environment. For example, the detection of fast movement of the RU with respect to the GU or the movement of interfering objects and/or living organisms may be used as a stopping (and, possibly, terminating) criterion, particularly when the steering algorithm is not expected to be optimal (i.e., avoid the interfering obstacles or track the movements with sufficient speed and/or accuracy).

Many starting criteria may be used for such algorithms. Examples of starting criteria are the detection of a change in the environment, such as, but not limited to the appearance of a new RU device (after a handshake), a user initiated request to start charging a device (e.g. when a "wireless charging" application or app exists on a the device), detection of a change in environment such as movement of the RU with respect to the GU, detection of the appearance of interfering objects and/or living organisms, and the like The initiation of the search algorithm may have a number of different basis, for example, avoidance of the interfering objects, tracking of the relative movement, and the like.

As described above, information from one or more amplitude and/or power detectors, range and/or location information from the beacons and/or a combination thereof may be used to determine a set of optimal programming parameters, or detect other circumstances such as the relative movement between the RU(s) and the GU(s) or interfering objects and/or living organisms, and the like. Other information may also be derived from the primary information sensed and/or gathered, as described further below.

The amplitude/power detectors disposed in an RU may include directional couplers, voltage meters, current meters, and/or peak detectors. The programmable test load circuit disposed in an RU may include programmable variable resistances and/or reactances. The information from the amplitude/power detectors may be used together or in combination with other information. For example, in combination with amplitude/power information generated by the GU (to provide information about the amount of power generated/transmitted by the GU), power transfer and/or conversion efficiency may be calculated to optimize and enhance wireless power transfer efficiency. Such calculation may also be used to detect the relative movements of the GU(s) and RU(s) (e.g. change in received/converted power versus no change in transmitted power), the appearance and/or disappearance of interfering objects and/or living organisms based on a drop or an increase of the detected transfer efficiency, either one-time or periodic (for example, living organisms with heartbeats or moving at certain speeds may affect the transfer efficiency in certain, periodic or otherwise detectable fashion), and the like.

As describe above, both the GU and/or the RU may use one or more transceivers to detect the presence, appearance, disappearance and/or movement of interfering objects and/or living organisms. Living organisms, in particular, may be detectable based on their biological activity such as heartbeat, heat generation, breathing or characteristic movement. Furthermore, other information such as, for example, the size of the organisms and/or its speed may be used to determine the type of organism (e.g. a pet, a baby, an adult, a bird, to name a few). The system may respond differently in the presence of living organism to minimize exposure to RF waves that these organisms experience. A number of different techniques may be used to achieve this such as, for example, by reducing the total amount of power delivered, minimizing and/or avoiding the amount of power sent in a particular direction or into the location where living organisms are present, shutting off all operations, generating alerts to make sentient organisms such as pets and adults aware of the operation of the system, and the like.

A number of different systems may be used to detect the presence, speed and size of such organisms. For example, an infrared camera may be used to detect the heat generated either by the living organisms themselves and/or through their breaths, or the speed and type of movements. Furthermore, independent movement of their parts (arms, legs, heads, and tails, among others) may be used to distinguish living organisms from inanimate objects. Certain regular features such as the frequency of breathing and/or heartbeat may potentially be detected by the frequency with which the detected, converted and/or reflected power changes. Such systems may be used as part of a wireless power transfer, in accordance with the embodiments of the present invention, to detect the presence, movement, appearance and/or disappearance of interfering objects and/or living organisms. Such systems may be present at in an RU, in accordance with any of the embodiments described above, to provide the required functions in cooperation with a GU.

In some embodiments of the present invention, a handshake is performed between an RU and a GU prior to sending RF power from the GU to the RU. The handshake may, among other things, alert the GU to the presence of the RU, define a unique identifiers for further communication (i.e. the GU assigns the RU a unique identifier), provide information such as the type of the RU (e.g. smart device, phone, tablet computer, universal power source to name a few) to provide better wireless power service, define the minimum and/or maximum power needed/acceptable, set the frequency of operation (in case the generation unit can operate at multiple frequencies), establish the availability of communication channels/protocols to agree on a suitable and/or optimal one under any given circumstances, identify firmware and software versions (e.g. to update firmware and software programs), and the like. Either the GU, the RU or both can initially broadcast their presence on one or several channels, and one or both can initiate the communication.

In order to initiate the handshake, provide control and perform the communication, the GU, the RU or both typically include or use available processing and communication hardware/software. For example, as discussed above, an RU may use the communication capabilities of a smart device to be powered. Similarly, a GU typically includes communication hardware such as, WiFi, Bluetooth, Zigbee, and the like, as well as processing capabilities provided by a digital control block, as described above. Broadcasting and handshaking functionality may be implemented using any one of the well-known protocols such as WiFi. Various information may be exchanged between the GU(s) and the RU(s) in order to perform wireless power steering, coordinate action or other related tasks.

Initially, the GU(s), RU(s) and/or both may broadcast their presence via one or multiple predetermined communication channels and methods. Such methods include automated pairing of Bluetooth devices that are in range (referred to as general bonding in the case of Bluetooth), SSID broadcast in the case of the WiFi standard (the GU(s) serving as a WiFi access points in this case, and the RU(s) logging in to establish communication), other continuous and/or intermittent broadcast methods which may be initiated, for example, (i) automatically or upon user request, or (ii) at certain predetermined times or as a result of predetermined conditions such as, the absence of interfering object and/or living organisms, as well as the channels to indicate the presence and request for the initial handshake. These methods can use various levels of security, depending on the required circumstances. For example, the GUs may require the use of secured communication channels to prevent attacks by non-approved devices. The RUs may require similar methods to prevent hostile attackers from posing as GU(s) (e.g. to interfere with the correct operation of the device to be attacked).

Many known methods exists for establishing and maintaining secure communication such as the RSA method, Diffie-Hellman key exchange, pre-shared secret keys or key schedules. During the initial handshake, other useful and/or required information may also be exchanged, such as, the hardware, firmware and/or software versions used by the GU(s) and/or RU(s) to establish compatibility between different systems, power requirements by the RU(s), total available power by the GU(s), choice of wireless frequency to be used in case of multiple available frequencies, choice of frequencies, standards, protocols and/or other methods to be used for subsequent communication.

Sign-off protocols may be used to accomplish the opposite of initial pairing. These can be performed on the individual units without interaction between GU(s) and RU(s) (for example, when units drop out of range) or as part of an agreed upon sign-off protocol, whether user-initiated or determined by one or more environmental circumstances such as the appearance and/or disappearance of interfering objects and/or living organisms, detection of movement or other changes.

Accordingly, the GU(s) and/or the RU(s) obtain and maintain a record of available wireless power assets/targets, and provide further information when a need for wireless charging is detected. For example, requests for wireless power by the RU(s) can be issued conditionally, such as when the battery power level drops below a certain level, or when objects and/or living organisms that were detected as being in the path of charging have disappeared, or certain other events such as the time-of-day has been reached. This allows the GU(s) to operate in various stand-by modes that allow communication with RU(s), but disable other functionality such as interfering object detection, to save power consumption.

Steering power from the GU(s) to the RU(s) wirelessly begins with a request for the power transfer. In some embodiments, the request may include additional information about the method used for steering wireless power. Examples of such methods include the raster scan, described above, which may use any one of a different optimization algorithms, regardless of whether power needs to be directed towards the RU for the first time, whether continuous tracking is requested (i.e. in the case of a mobile RU), and the like. The request may be present in the initial communication handshake. The specific wireless power transfer used may be defined by the particular capabilities of the RU(s), and/or environmental conditions. In accordance with some embodiments, a feed-back signal is transmitted from the RU(s) to the GU(s), or vice-versa, to provide information about the power transfer from the GU to the RU. The following is an example of an algorithm or a protocol that steers wireless power from a GU to an RU:

Communication is established between the RU and GU on request by the RU. The GU also serves as a wireless network router. The RU logs onto the WiFi access point provided by the GU.

The GU provides the RU with an identifier to be used in subsequent communication.

Wireless power steering towards the RU is initiated by another user request on the RU side and communicated to the GU via the WiFi interface The GU instructs the RU to use one of the available test loads The GU changes programming parameters for the individual GU elements programming settings.

The RU provides the GU with a measure of the received as well as the converted power. The received power is defined by reading one or several (this is configurable) converted DC voltages at the outputs of each of the RF-to-DC conversion elements. In an alternative implementation, a measure for the received power is obtained by calculating the square of such voltages.

The GU algorithm steps through different programming settings to increase the power transfer efficiency. The GU will issue commands to the RU to switch to different test-loads at various points during the steering procedure if deemed advantageous The GU algorithm terminates once it has determined that the power steering can no longer be improved. Alternatively, the algorithm could terminate once a minimum acceptable power level has been achieved. A minimum available power measure is available on the RU defined by the power generated using a known test-load.

Figure 12:
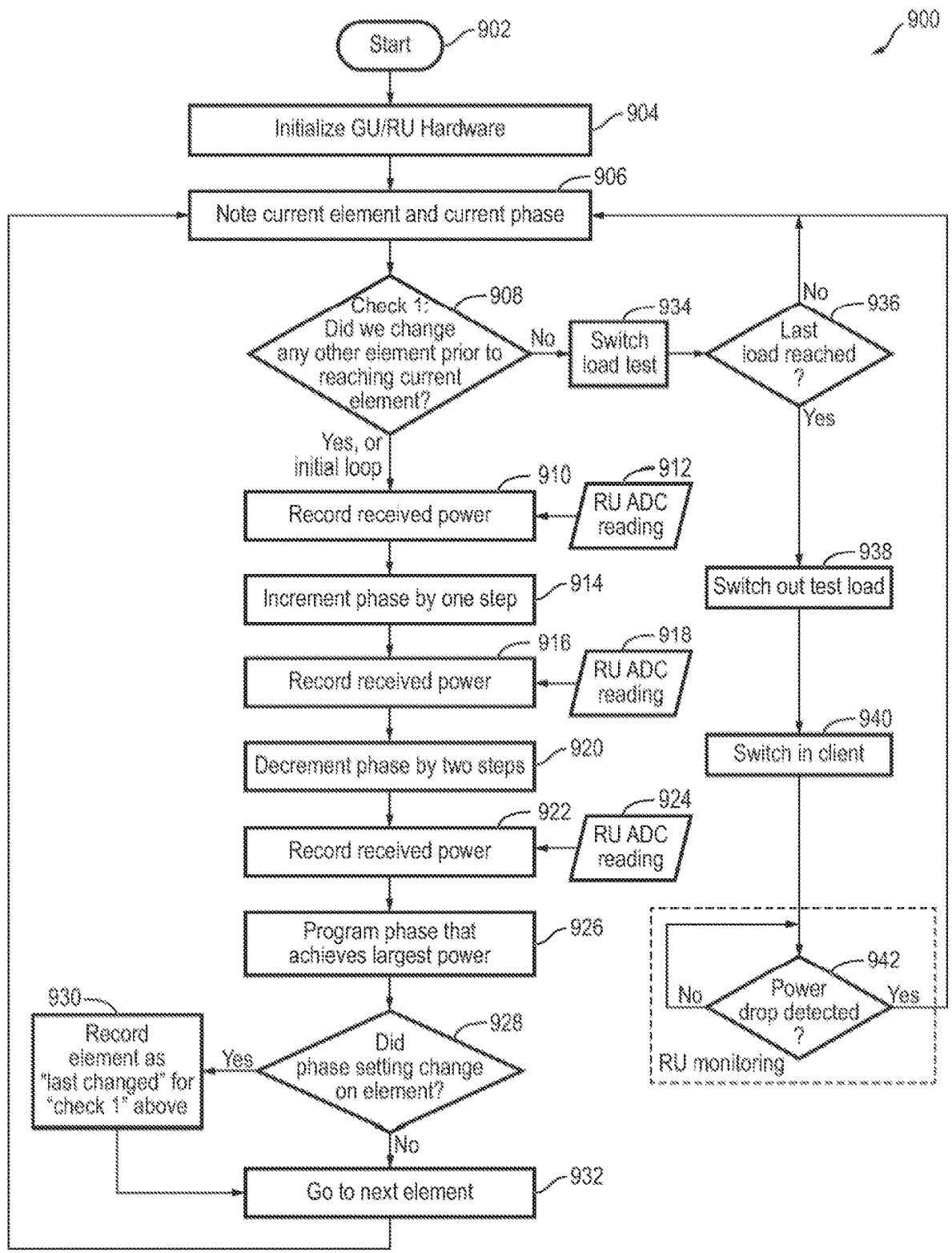
FIG. 12 is a flowchart for wirelessly powering a device, in accordance with one embodiment of the present invention.

FIG. 12 is a flowchart 900 for wirelessly powering a device, in accordance with one embodiment of the present invention. After starting the process at 902, the GU and RU are initialized at 904. Next, to start the power delivery optimization process, an initial phase is selected for the RF wave transmitted by each of the GU elements (transmitter antennas) disposed in the GU transmitter array. At 906 the phase associated with the GU current element is noted. Next, if at 908 it is determined that the phase of any other GU element was varied earlier, the RF power received at the RU charging the device is recorded 910. The received RF power is optionally converted to a digital format at 912. Next at 914, the phase of the GU element is incremented by one step (e.g., the $2\pi$ phase may be divided into 18 equal steps), and the received power is recorded at 916. The received RF power is optionally converted to a digital format at 918. Next at 920, the phase of the GU element is decremented by two steps, and the received power is recorded at 922. The received RF power is optionally converted to a digital format at 924. Next at 926, the phase that achieves the highest power delivery from the previous three adjustments is programmed in the RU receiving adjusted (current RU). If at 928 it is determined that the phase of the current RU was changed from its prior setting, at 930 the current element is identified and marked as having been changed for use in evaluation during 908. Next, at 932, the next element in the GU is selected for evaluation and possible adjustment and the process then moves to 906. If at 928 it is determined that the phase of the current RU was not changed from its prior setting, at 932, the next element in the GU is selected for evaluation and possible adjustment and the process then moves to 906. In yet other embodiments of wirelessly powering a device, the phases of the GU elements are incremented (or decremented) by some or all the available steps that the $2\pi$ phase is divided into. For example, if the $2\pi$ phase is divided into 18 equal steps, the phases of the GU elements are incremented (or decremented) 18 times each time by a phase of nominally $\pi/9$ (i.e. 20 degrees).

If at 908 a determination is made that the phase of other GU elements were not varied earlier, the amount of load supplied at the output of RF-to-DC converter is varied at 934. Next at 936, if it is determined that the last value of the load (e.g., the lowest resistive load) has not yet been reached, the process moves to 906. If at 936 it is determined that the last value of the load has been reached, at 938, the test loads are switched off at 938 (i.e., disconnected from the RU), and the device-to-be-powered is switched in (connected to the RU) at 940. As long as the power level remains relatively stable and does not drop significantly, the device continues to be powered with the current settings at 942. If however, there is a drop in the amount of power at the RU at 942, the process moves back to 906 to determine new phase settings for the GU elements.

Figure 13:
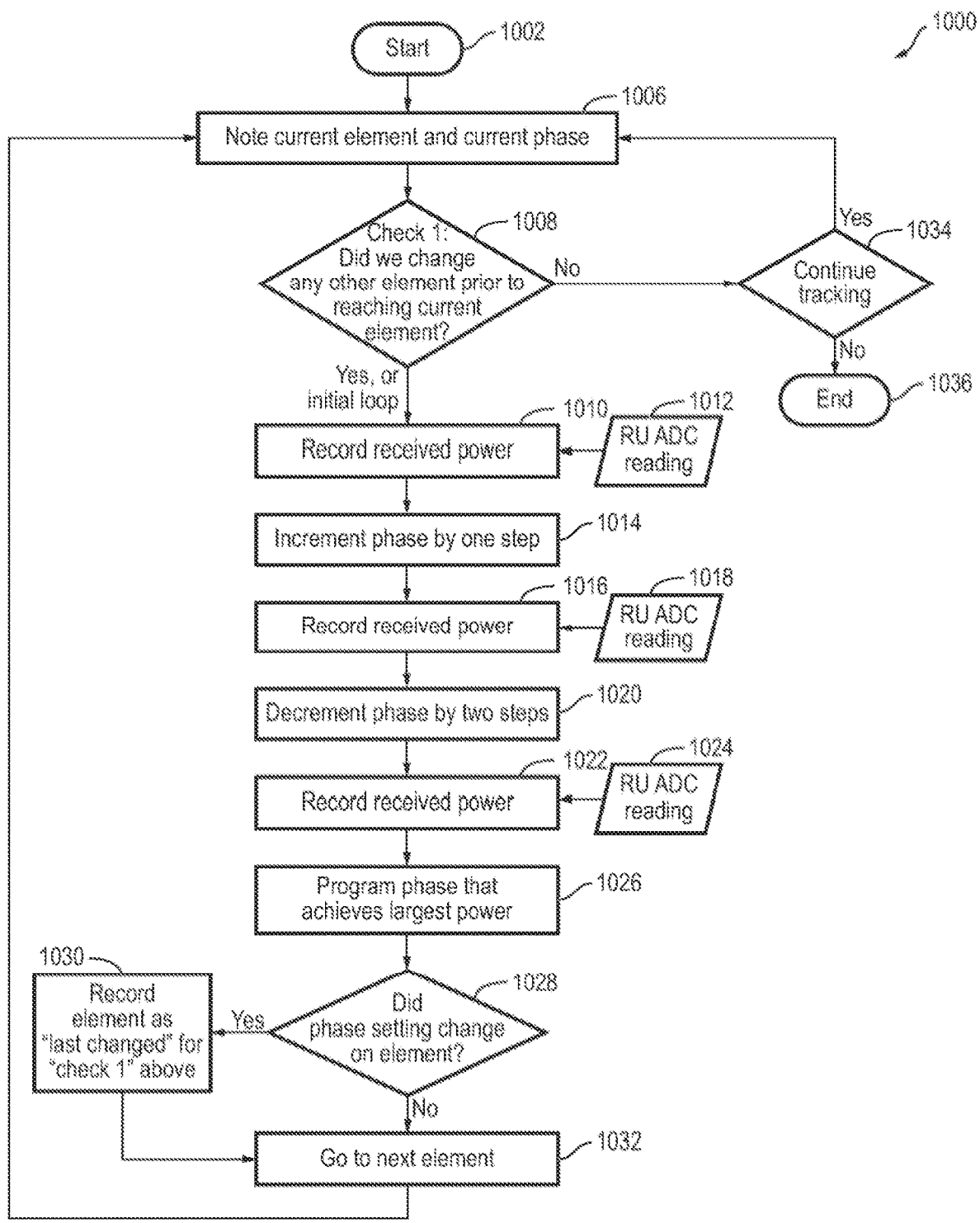
FIG. 13 is a flowchart for tracking a device in accordance with one embodiment of the present invention.

FIG. 13 is a flowchart 1000 for tracking a device, in accordance with one embodiment of the present invention. After starting the process at 1002, an initial phase is selected for the RF wave transmitted by each of the GU elements (transmitter antennas) disposed in the GU transmitter array. At 1006 the phase associated with the GU current element is noted. Next, if at 1008 it is determined that the phase of any other GU element was varied earlier, the RF power received at the RU charging the device is recorded 1010. The received RF power is optionally converted to a digital format at 1012. Next at 1014, the phase of the GU element is incremented by one step (e.g., the $2\pi$ phase may be divided into 18 equal steps), and the received power is recorded at 1016. The received RF power is optionally converted to a digital format at 1018. Next at 1020, the phase of the GU element is decremented by two steps, and the received power is recorded at 1022. The received RF power is optionally converted to a digital format at 1024. Next at 1026, the phase that achieves the highest power delivery is programmed in the RU receiving adjusted (current RU). If at 1028 it is determined that the phase of the current RU was changed from its prior setting, at 1030 the current element is identified and marked as having been changed for use in evaluation during 1008. Next, at 1032, the next element in the GU is selected for evaluation and possible adjustment and the process then moves to 1006. If at 1028 it is determined that the phase of the current RU was not changed from its prior setting, at 1032, the next element in the GU is selected for evaluation and possible adjustment and the process then moves to 1006.

If at 1008 a determination is made that the phase of other GU elements were not varied earlier and that the tracking is to continue, the process moves to 1006. If at 1008 a determination is made that the phase of other GU elements were not varied earlier and that the tracking is not to continue, the process ends at 1036.

In some embodiments, the logic control block disposed in the RU monitors operation of the DC-to-DC converters. Information about the operation of the DC-to-DC converter, or other information regarding the operating status of the GU(s) and/or RU(s), may be relayed between the RU(s) and GU(s) to optimize the operation of the wireless power system and/or obtain other operational advantages.

In some embodiments, the RU may send one or more beacon tones to determine the correct programming settings of the GU. In such embodiments, upon initiation of power transfer, the GU may request one or more beacon tones of one or multiple different kinds available to be sent by the RU. In yet other embodiments, the RU may initiate beacon transmission without an explicit initial request, but based on a predetermined, agreed-upon wireless power transfer protocol.

In some embodiments, the RU may send its global-position system (GPS) coordinates or equivalent information to the GU. The GU may use the information about the position of the RU as well as the information about its own position, its orientation and the layout of its elements, among other things, to determine an optimal set of programming parameters. In this case, upon initiation of power transfer, such information is relayed across the GU-RU communication channel.

The above embodiments of the present invention are illustrative and not limitative. The above embodiments of the present invention are not limited by the number or type of recovery elements disposed in a recovery unit. The above embodiments of the present invention are not limited by the impedance transformation/matching block, amplitude/power detector, RF load matching circuit, RF-to-DC converter, programmable test load block, DC-to-DC converter, and digital control block control that may be disposed in a recovery unit. The above embodiments of the present invention are not limited by the number of integrated circuits or semiconductor substrates that may be used to form a recovery unit. Other modifications and variations will be apparent to those skilled in the art and are intended to fall within the scope of the appended claims.

What is claimed is:

1. A recovery unit adapted to receive a radio frequency (RF) signal and generate a DC power in response, the recovery unit comprising:
   at least one antenna for receiving the RF signal;
   an RF-to-DC converter generating the DC power from the RF signal;
   a detector detecting a signal in response to a presence of a living organism positioned in a path of the received RF signal; and
   a wireless communication circuit adapted to cause an RF signal generating unit to vary a power of the RF signal in accordance with the detected signal.

2. The recovery unit of claim 1 wherein said detector comprises an infrared sensor comprising at least one pixel.

3. The recovery unit of claim 1 wherein said detector detects a change in a frequency of a portion of the RF signal.

4. The recovery unit of claim 1 wherein said detector further detects the living organism when the living organism partially blocks the path between the RF signal generating unit and the recovery unit.

5. The recovery unit of claim 1 further comprising: an impedance matching circuit disposed between the at least one antenna and the RF-to-DC converter.

6. The recovery unit of claim 5 further comprising:
   an RF circuit coupled to the RF-to-DC converter and adapted to block the RF signal from reaching an output terminal of the RF-to-DC converter.

7. The recovery unit of claim 5 further comprising:
   an amplitude detector.

8. The recovery unit of claim 7 wherein said amplitude detector is coupled to an input terminal of the RF-to-DC converter.

9. The recovery unit of claim 7 wherein said amplitude detector is coupled to an output terminal of the RF-to-DC converter.

10. The recovery unit of claim 9 further comprising:
    an analog-to-digital converter adapted to convert an output of the amplitude detector to a digital signal.

* * * * *